United States Patent
Akiyama et al.

(10) Patent No.: US 9,223,601 B2
(45) Date of Patent: Dec. 29, 2015

(54) CONTROL DEVICE, CONTROL METHOD, AND NON-TRANSITORY COMPUTER-READABLE STORAGE MEDIUM FOR A VIRTUAL SYSTEM DEPLOYMENT

(71) Applicant: FUJITSU LIMITED, Kawasaki-shi (JP)

(72) Inventors: Naoki Akiyama, Kawasaki (JP); Takayuki Maeda, Kawasaki (JP); Norihiko Sakamoto, Yokohama (JP); Hideo Shimizu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 569 days.

(21) Appl. No.: 13/625,014

(22) Filed: Sep. 24, 2012

(65) Prior Publication Data

US 2013/0086584 A1    Apr. 4, 2013

(30) Foreign Application Priority Data

Sep. 30, 2011    (JP) .................................. 2011-218495

(51) Int. Cl.
*G06F 9/455*    (2006.01)
(52) U.S. Cl.
CPC ........ *G06F 9/45533* (2013.01); *G06F 9/45558* (2013.01); *G06F 2009/4557* (2013.01); *G06F 2009/45562* (2013.01)
(58) Field of Classification Search
None
See application file for complete search history.

(56) References Cited

U.S. PATENT DOCUMENTS

| 7,191,440 B2 | 3/2007 | Cota-Robles et al. | |
| 7,577,722 B1 * | 8/2009 | Khandekar et al. | 709/220 |
| 8,819,673 B1 * | 8/2014 | Wilkinson et al. | 718/1 |
| 8,910,156 B1 * | 12/2014 | Kenchammana-Hosekote et al. | 718/1 |
| 2009/0077090 A1 * | 3/2009 | Pacifici et al. | 707/10 |
| 2009/0240924 A1 * | 9/2009 | Yasaki et al. | 712/220 |
| 2009/0241112 A1 | 9/2009 | Shimogawa | |
| 2009/0249334 A1 * | 10/2009 | Yamaguchi et al. | 718/1 |
| 2009/0249354 A1 * | 10/2009 | Yamaguchi et al. | 718/106 |
| 2010/0030898 A1 | 2/2010 | Imai et al. | |
| 2010/0095297 A1 * | 4/2010 | Sethi et al. | 718/1 |
| 2010/0250744 A1 * | 9/2010 | Hadad et al. | 709/226 |
| 2010/0325628 A1 * | 12/2010 | Haga et al. | 718/1 |
| 2011/0087874 A1 * | 4/2011 | Timashev et al. | 713/100 |

(Continued)

FOREIGN PATENT DOCUMENTS

| JP | 2002-196939 A | 7/2002 |
| JP | 2003-318900 | 11/2003 |

(Continued)

OTHER PUBLICATIONS

Japanese Office Action mailed Jan. 13, 2015 for corresponding Japanese Patent Application No. 2011-218495, with Partial English Translation, 4 pages.

(Continued)

*Primary Examiner* — Hiren Patel
(74) *Attorney, Agent, or Firm* — Fujitsu Patent Center

(57) ABSTRACT

A control device includes a memory and a processor coupled to the memory, wherein the processor executes a process comprising determining the order of setting of operating conditions which are set to a plurality of virtual machines and make the virtual machines operate, respectively, in accordance with processing dependency between software executed by the plurality of virtual machines and first setting the respective operating conditions of the virtual machines in the setting order at the determining.

8 Claims, 17 Drawing Sheets

(56) References Cited

U.S. PATENT DOCUMENTS

| | | | |
|---|---|---|---|
| 2011/0197188 A1* | 8/2011 | Srinivasan et al. | 718/1 |
| 2011/0225591 A1 | 9/2011 | Wada et al. | |
| 2011/0271280 A1* | 11/2011 | Cao et al. | 718/1 |
| 2012/0011505 A1* | 1/2012 | Fujisaki et al. | 718/1 |

FOREIGN PATENT DOCUMENTS

| | | |
|---|---|---|
| JP | 2010-039626 | 2/2010 |
| JP | 2011-186637 A | 9/2011 |
| JP | 2011-186793 A | 9/2011 |

OTHER PUBLICATIONS

Extended European Search Report dated Jan. 3, 2013 for corresponding European Application No. 12185658.7.

Japanese Office Action mailed Oct. 6, 2015 for corresponding Japanese Patent Application No. 2011-218495, with Partial English Translation, 4 pages.

* cited by examiner

FIG.3

```xml
<template>
  <name>Web-AP-DB System</name>
  <vnets>
    <vnet> <id>net1</id> <name>DMZ</name> </vnet>
    <vnet> <id>net2</id> <name>SubnetA</name> </vnet>
    <vnet> <id>net3</id> <name>SubnetB</name> </vnet>
  </vnets>

<servers>
    <server>
      <no>1</no>
      <name>Web1 Server</name>
      <imageId>image1</imageId>
      <vnics>
        <vnic> <no>1</no> <networkId>net1</networkId> </vnic>
        <vnic> <no>2</no> <networkId>net2</networkId> </vnic>
      </vnics>
      <softwares>
        <software> <no>1</no> <id>SW01</id> </software>
      </softwares>
    </server>

<server>
      <no>2</no>
      <name>Web2 Server</name>
      <imageId>image2</imageId>
      <vnics>
        <vnic> <no>1</no> <networkId>net1</networkId> </vnic>
        <vnic> <no>2</no> <networkId>net2</networkId> </vnic>
      </vnics>
      <softwares>
        <software> <no>1</no> <id>SW01</id> /software>
      </softwares>
    </server>

<server>
      <no>3</no>
      <name>AP Server</name>
      <imageId>image3</imageId>
      <vnics>
        <vnic> <no>1</no> <networkId>net2</networkId> </vnic>
        <vnic> <no>2</no> <networkId>net3</networkId> </vnic>
      </vnics>
      <softwares>
        <software> <no>1</no> <id>SW02</id> </software>
      </softwares>
    </server>
  </servers>

<server>
      <no>4</no>
      <name>DB Server</name>
      <imageId>image4</imageId>
      <vnics>
        <vnic> <no>1</no> <networkId>net3</networkId> </vnic>
      </vnics>
      <softwares>
        <software> <no>1</no> <id>SW03</id> </software>
      </softwares>
    </server>
  </servers>
</template>
```

FIG.4

```
<parameterInfo>
<parameters>
<parameter>
<key>server[1].software[1].web.ap.connection.ipaddress</key>
<value>#{server[3].nic[1].ipaddress}</value>
</parameter>
<parameter>
<key>server[1].software[1].web.ap.connection.port</key>
<value>#{server[3].software[1].ap.connection.port}</value>
</parameter>
<parameter>
<key>server[2].software[1].web.ap.connection.ipaddress</key>
<value>#{server[3].nic[1].ipaddress}</value>
</parameter>
<parameter>
<key>server[2].software[1].web.ap.connection.port</key>
<value>#{server[3].software[1].ap.connection.port}</value>
</parameter>
<parameter>
<key>server[3].software[1].ap.db.jdbc.url</key>
<value>jdbc:symford://#{server[4].nic[1].ipaddress}:#{server[4].software[1].db.port}/CFMGDB</value>
</parameter>
<parameter>
<key>server[3].software[1].ap.connection.port</key>
<value>9008</value>
</parameter>
<parameter>
<key>server[4].software[1].db.port</key>
<value>2050</value>
</parameter>
</parameters>
</parameterInfo>
```

FIG.5

| SERVER NUMBER | NAME |
|---|---|
| 1 | Web1 Server |
| 2 | Web2 Server |
| 3 | AP Server |
| 4 | DB Server |

FIG.6

| SERVER NUMBER | NIC NUMBER | IP ADDRESS |
|---|---|---|
| 1 | 1 | 192.168.1.2 |
| 1 | 2 | 192.168.2.2 |
| 2 | 1 | 192.168.1.3 |
| 2 | 2 | 192.168.2.3 |
| 3 | 1 | 192.168.2.4 |
| 3 | 2 | 192.168.3.2 |
| 4 | 1 | 192.168.3.3 |

FIG.7

| SERVER NUMBER | SOFTWARE NUMBER | PARAMETER DEFINITION ID |
|---|---|---|
| 1 | 1 | SW01 |
| 2 | 1 | SW01 |
| 3 | 1 | SW02 |
| 4 | 1 | SW03 |

FIG.8

| SERVER NUMBER | SOFTWARE NUMBER | PARAMETER KEY | PARAMETER VALUE |
|---|---|---|---|
| 1 | 1 | web.ap.connection.ipaddress | #{server[3].nic[1].ipaddress} |
| 1 | 1 | web.ap.connection.port | #{server[3].software[1].ap.connection.port} |
| 2 | 1 | web.ap.connection.ipaddress | #{server[3].nic[1].ipaddress} |
| 2 | 1 | web.ap.connection.port | #{server[3].software[1].ap.connection.port} |
| 3 | 1 | ap.db.jdbc.url | jdbc:symford://#{server[4].nic[1].ipaddress}:#{server[4].software[1].db.port}/CFMGDB |
| 3 | 1 | ap.connection.port | 9008 |
| 4 | 1 | db.port | 2050 |

FIG.9

| SETTING-SIDE SERVER NUMBER | SETTING-SIDE SOFTWARE NUMBER | SETTING-SIDE PARAMETER KEY | REFERENCE-SIDE SERVER NUMBER | REFERENCE-SIDE SOFTWARE NUMBER | REFERENCE-SIDE PARAMETER KEY |
|---|---|---|---|---|---|
| 1 | 1 | web.ap.connection.ipaddress | 3 | 1 | nic[1].ipaddress |
| 1 | 1 | web.ap.connection.port | 3 | 1 | ap.connection.port |
| 2 | 1 | web.ap.connection.ipaddress | 3 | 1 | nic[1].ipaddress |
| 2 | 1 | web.ap.connection.port | 3 | 1 | ap.connection.port |
| 3 | 1 | ap.db.jdbc.url | 4 | 1 | nic[1].ipaddress |
| 3 | 1 | ap.db.jdbc.url | 4 | 1 | db.port |

FIG.10

| SERVER NUMBER | CLASSIFICATION OF CONNECTION | PRIORITY ORDER |
|---|---|---|
| 4 | REFERENCE ONLY | 1 |
| 3 | SETTING AND REFERENCE | 2 |
| 2 | SETTING ONLY | 3 |
| 1 | SETTING ONLY | 4 |

FIG.11

| SERVER NUMBER | SOFTWARE NUMBER | CLASSIFICATION OF CONNECTION | PRIORITY ORDER |
|---|---|---|---|
| 4 | 1 | REFERENCE ONLY | 1 |
| 3 | 1 | SETTING AND REFERENCE | 2 |
| 2 | 1 | SETTING ONLY | 3 |
| 1 | 1 | SETTING ONLY | 4 |

FIG.12

| SOFTWARE (PARAMETER DEFINITION ID) | PARAMETER KEY (NAME OF PARAMETER) | TYPE | EXPLANATION | SCRIPT |
|---|---|---|---|---|
| Web (SW01) | web.ap.connection.ipaddress | string | IP ADDRESS OF CONNECTION DESTINATION | script_web.zip |
| | web.ap.connection.port | number | CONNECTION DESTINATION PORT | |
| | operation (METHOD) | number | START, EXIT, RESTART | |
| AP (SW02) | ap.connection.port | string | AP CONNECTION PORT | script_ap.zip |
| | ap.db.jdbc.driver | string | JDBC DRIVER | |
| | ap.db.jdbc.url | string | JDBC CONNECTION DESTINATION | |
| | operation (METHOD) | number | START, EXIT, RESTART | |
| DB (SW03) | db.port | string | DB CONNECTION PORT | script_db.zip |
| | operation (METHOD) | number | START, EXIT, RESTART | |

FIG.16

| SERVER NUMBER | SOFTWARE NUMBER | PARAMETER KEY | PARAMETER VALUE |
|---|---|---|---|
| 1 | 1 | web.ap.connection.port | #{server[3].software[1].ap.connection.port} |
| 3 | 1 | ap.connection.port | 9008 |

FIG.17

| SERVER NUMBER | SOFTWARE NUMBER | PARAMETER KEY | PARAMETER VALUE |
|---|---|---|---|
| 1 | 1 | web.ap.connection.port | #{server[2].software[1].web.ap.connection.port} |
| 2 | 1 | web.ap.connection.port | #{server[3].software[1].ap.connection.port} |
| 3 | 1 | ap.connection.port | 9008 |

FIG.18

| SERVER NUMBER | SOFTWARE NUMBER | PARAMETER KEY | PARAMETER VALUE |
|---|---|---|---|
| 1 | 1 | web.ap.connection.port | #{server[2].software[1].web.ap.connection.port} |
| 2 | 1 | web.ap.connection.port | #{server[3].software[1].ap.connection.port} |
| 3 | 1 | ap.connection.port | #{server[1].software[1]web.ap.connection.port} |

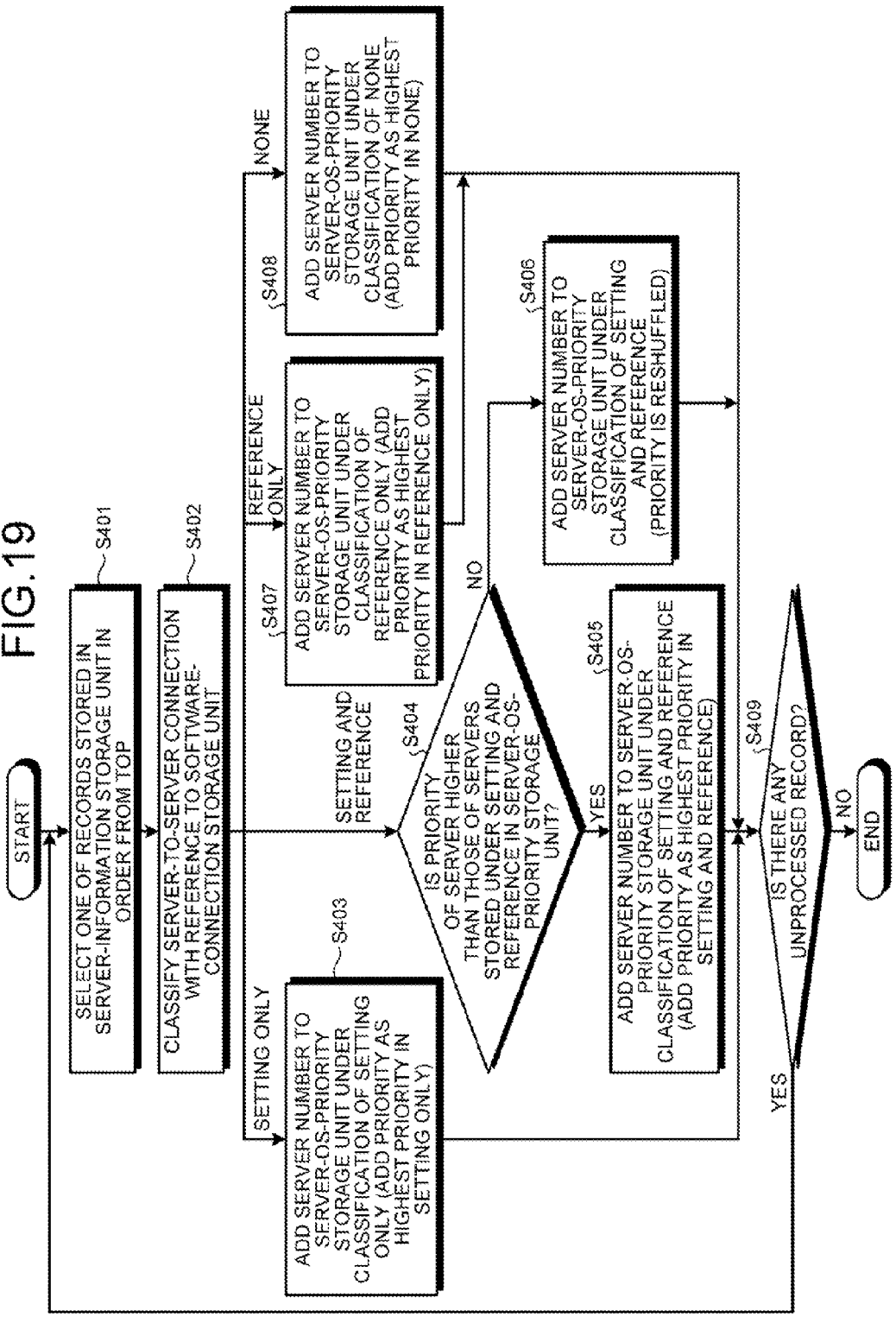

CONTROL DEVICE, CONTROL METHOD, AND NON-TRANSITORY COMPUTER-READABLE STORAGE MEDIUM FOR A VIRTUAL SYSTEM DEPLOYMENT

CROSS-REFERENCE TO RELATED APPLICATION

This application is based upon and claims the benefit of priority of the prior Japanese Patent Application No. 2011-218495, filed on Sep. 30, 2011, the entire contents of which are incorporated herein by reference.

FIELD

The embodiments discussed herein are directed to a control device, a control method, and a control program.

BACKGROUND

Conventionally, as a technology to provide a virtual system to a user, a technology to register a system including a plurality of networks and servers as a template and deploy the system in response to a user request has been known. By deploying the system registered as the template, images of the servers included in the template are cloned, and the system operates as an independent virtual system.

When a virtual system is deployed, new IP (Internet Protocol) addresses and host names are assigned to virtual servers included in the virtual system; with this, an IP address and host name of an OS (Operating System) or software are also automatically changed. However, the setting of a parameter of an IP address or host name specifying a connection destination of software, i.e., a parameter indicating a connection between software is manually changed. Incidentally, the parameter indicating a software-to-software connection includes, for example, a port number. For example, even if the port number 200 used for software A on a Web server A can be automatically set, the port number 200 is not to be automatically set with respect to software B on a Web server B to which the software A is connected, so the port number 200 is manually set with respect to the software B.

In recent years, there is known a technology for reducing the burden in setting a parameter indicating a software-to-software connection when a virtual system is deployed. For example, there is known a technology to create a flow with respect to each virtual system deployed and set a parameter indicating a software-to-software connection on the basis of the created flow.

Patent document 1: Japanese Laid-open Patent Publication No. 2010-039626
Patent document 2: Japanese Laid-open Patent Publication No. 2003-318900

However, in the related technologies, there is a problem that it is not possible to automatically set a parameter indicating a software-to-software connection.

For example, when a virtual system is deployed with a template, a system to be deployed generally differs among customers and businesses. Furthermore, different customers and businesses use different types and numbers of software. Therefore, it requires an extreme amount of time and trouble to check respective types and numbers of software with respect to each system to be deployed and create a flow suitable for each system. In this manner, in the related technologies, a burdensome flow is created each time a virtual system is deployed; therefore, it is hard to say that a parameter indicating a software-to-software connection can be automatically set.

SUMMARY

According to an aspect of the embodiments, a control device comprising: a memory; and a processor coupled to the memory, wherein the processor executes a process comprising: determining the order of setting of operating conditions which are set to a plurality of virtual machines and make the virtual machines operate, respectively, in accordance with processing dependency between software executed by the plurality of virtual machines; and first setting the respective operating conditions of the virtual machines in the setting order determined at the determining.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a template stored in a system-template storage unit;

FIG. 4 is a diagram illustrating an example of a template stored in a software-template storage unit;

FIG. 5 is a diagram illustrating an example of information stored in a server-information storage unit;

FIG. 6 is a diagram illustrating an example of information stored in an NIC-information storage unit;

FIG. 7 is a diagram illustrating an example of information stored in a software-information storage unit;

FIG. 8 is a diagram illustrating an example of information stored in a software-parameter storage unit;

FIG. 9 is a diagram illustrating an example of information stored in a software-connection storage unit;

FIG. 10 is a diagram illustrating an example of information stored in a server-OS-priority storage unit;

FIG. 11 is a diagram illustrating an example of information stored in a software-priority storage unit;

FIG. 12 is a diagram illustrating an example of a parameter and method defined in a script;

FIG. 16 is a diagram illustrating an example of the software-parameter storage unit for explaining whether there is a further variable in a variable parameter value;

FIG. 17 is a diagram illustrating the software-parameter storage unit indicating an example where a reference of a variable is not a circular reference;

FIG. 18 is a diagram illustrating the software-parameter storage unit indicating an example where a reference of a variable is a circular reference;

FIG. 19 is a flowchart illustrating a flow of a priority determining process 1 performed by the setting control device according to the second embodiment;

DESCRIPTION OF EMBODIMENTS

Preferred embodiments will be explained with reference to accompanying drawings. Incidentally, the present invention is not limited to the embodiments.

[a] First Embodiment

Figure 1:
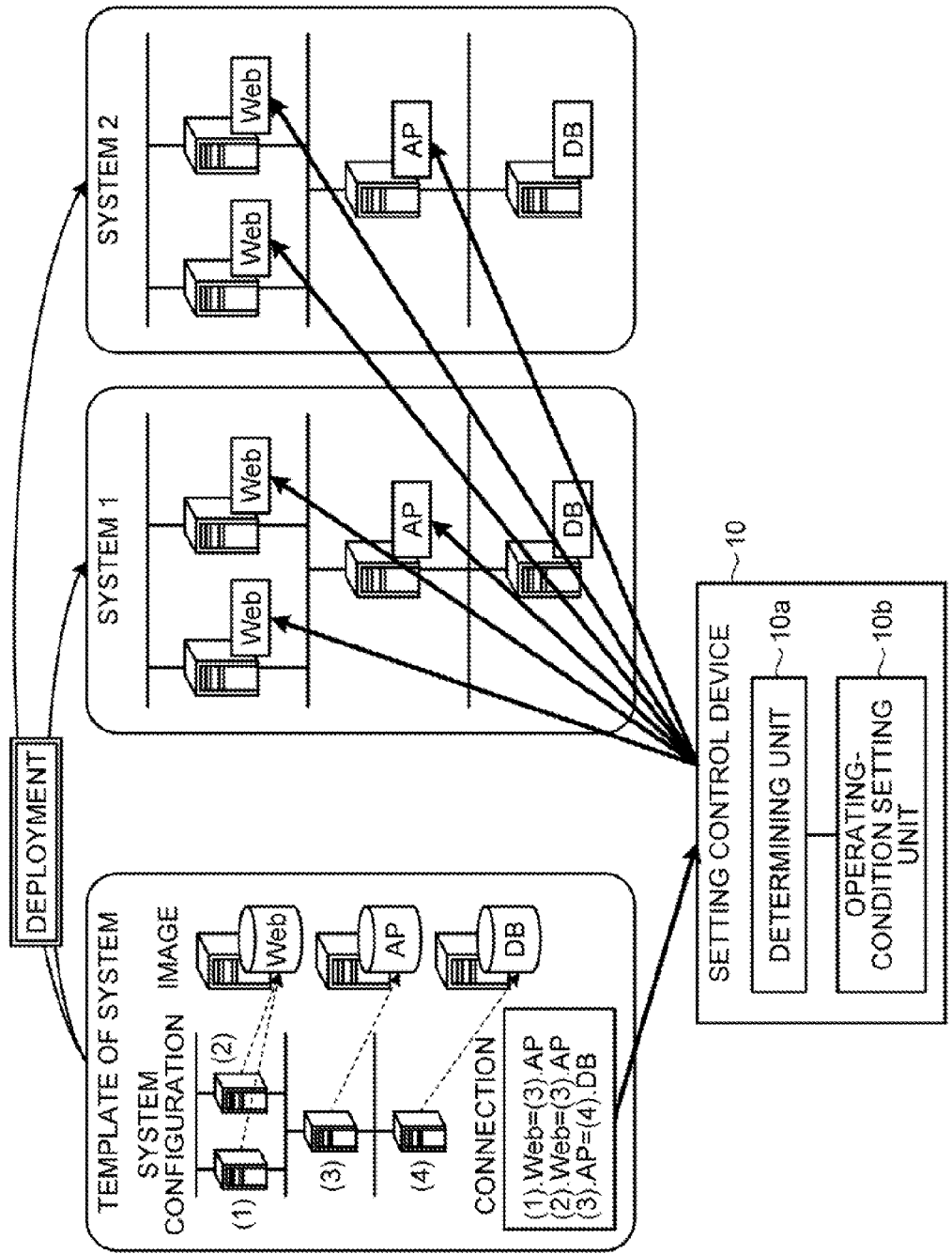
FIG. 1 is a diagram illustrating an overall configuration example of a system according to a first embodiment.

FIG. 1 is a diagram illustrating an overall configuration example of a system according to a first embodiment. A setting control device 10 illustrated in FIG. 1 is a server device that registers a system including a plurality of networks and servers as a template, and deploys a system in response to a user request and provides the virtual system to a user. In doing this way, images of the servers included in the template are cloned, and the system operates as an independent virtual system.

In the case of FIG. 1, the setting control device 10 holds a configuration of a system composed of two Web servers, one application (AP) server, and one database (DB) server as a template in an internal or external storage device. Then, upon receipt of a request for construction of a system from a user, the setting control device 10 deploys a system 1 or system 2 having the same configuration as the template of the system held therein on one or more physical servers. Namely, the setting control device 10 constructs a virtual system composed of two virtual Web servers, one virtual AP server, and one virtual DB server using physical resources existing on a cloud system, and provides the user the constructed virtual system as a private cloud.

Then, the setting control device 10 sets an operating condition with respect to each of the virtual servers included in the virtual system deployed in this way and sets a parameter in software and the like, and makes the whole system operate properly. Specifically, the setting control device 10 includes a determining unit 10a and an operating-condition setting unit 10b, and sets an operating condition of a virtual server with these units.

The determining unit 10a is a processing unit that determines the order of setting of operating conditions which are set to a plurality of virtual machines and make the virtual machines operate, respectively, in accordance with processing dependency between software executed by the plurality of virtual machines. The operating-condition setting unit 10b is a processing unit that sets the respective operating conditions of the virtual machines in the setting order determined by the determining unit 10a.

In this manner, the setting control device 10 can determine the order of execution of the setting of a virtual server from a connection state between software running on virtual servers. Namely, the setting control device 10 determines the setting order on the basis of not a physical or logical configuration of a connection state between virtual servers but how the virtual servers are connected by software. Therefore, the setting control device 10 can automatically set a parameter indicating a software-to-software connection without creating a flow with respect to each virtual system deployed.

[b] Second Embodiment

Subsequently, the setting control device described in the first embodiment is explained specifically. In a second embodiment, a configuration of the setting control device 10 and a flow of each process performed by the setting control device 10 are explained.

Configuration of Setting Control Device

Figure 2:
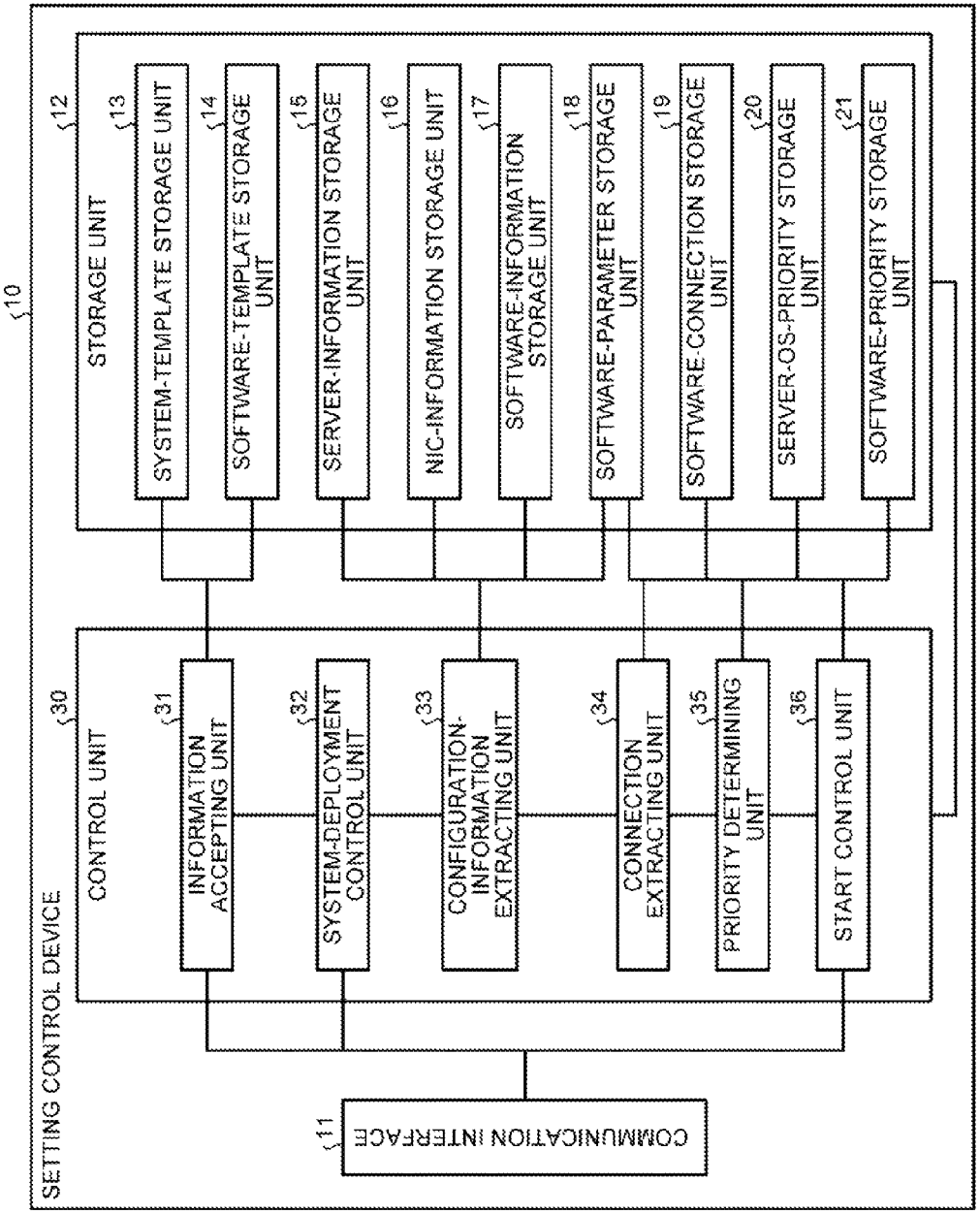
FIG. 2 is a functional block diagram illustrating a configuration of a setting control device according to a second embodiment.

FIG. 2 is a functional block diagram illustrating a configuration of a setting control device according to the second embodiment. As illustrated in FIG. 2, the setting control device 10 includes a communication interface 11, a storage unit 12, and a control unit 30. Incidentally, processing units and the like that the setting control device 10 includes are just an example, and it is not limited to them. For example, the setting control device 10 can further include an input unit such as a mouse, a display unit such as a display, a media reader for reading out information from a storage medium and writing accepted information on a storage medium, and the like.

The communication interface 11 is, for example, a network interface card (NIC) for controlling communication between the setting control device 10 and another device. For example, the communication interface 11 receives a request for deployment of a system from a user terminal, and transmits a command to set an operating condition in a deployed virtual server, a command or script to start the operation of the virtual server, and the like. Furthermore, the communication interface 11 transmits a command or script, etc. to set a parameter in software on the deployed virtual server, and transmits a command or script, etc. to start the operation of the software. Moreover, the communication interface 11 transmits a completion notification indicating completion of the setting of a virtual system and the start of the operation of the virtual system to the user terminal.

The storage unit 12 is a storage device that stores therein a program to be executed by the control unit 30 and data, and is, for example, a semiconductor device or a hard disk, etc. As illustrated in FIG. 2, the storage unit 12 includes a system-template storage unit 13, a software-template storage unit 14, a server-information storage unit 15, an NIC-information storage unit 16, and a software-information storage unit 17. Furthermore, the storage unit 12 includes a software-parameter storage unit 18, a software-connection storage unit 19, a server-OS-priority storage unit 20, and a software-priority storage unit 21. Incidentally, the storage units included in the storage unit 12 are in the form of a table, a DB, and the like.

The system-template storage unit 13 is a storage unit that stores therein a template defining a configuration of a virtual system and information specified in the template. Specifically, the system-template storage unit 13 stores therein a template indicating a configuration composed of a network, a server, an NIC, software as components. Incidentally, the template can be defined by, for example, an XML (eXtensible Markup Language) structure.

FIG. 3 is a diagram illustrating an example of the template stored in the system-template storage unit. As illustrated in FIG. 3, the template of the system is defined by "name", "vnets", and "servers". A user describes the settings on "name", "vnets", and "servers" in this template.

The "name" is for definition of a name of a virtual system; in the case of FIG. 3, a name of the virtual system is defined as "Web-AP-DB system". The "vnets" is for definition of virtual networks set in the virtual system. In the case of FIG. 3, DMZ (DeMilitarized Zone) assigned net1 as an ID, SubnetA assigned net2 as an ID, and SubnetB assigned net3 as an ID are defined.

The "servers" is for definition of virtual servers, and "no", "name", "imageId", "vnics", and "software" are defined. The "no" defines a server identifier identifying a virtual server; the "name" defines a host name of the virtual server; the "imageId" defines an image of an operating system (OS) or C drive of the virtual server. Furthermore, the "vnics" defines a virtual network that the virtual server uses; the "software" defines software that the virtual server executes.

To explain an example with FIG. 3, in a "Web1 Server" assigned "1" as an identifier, "image1" is defined as an image. Furthermore, in the "Web1 Server", "net1", i.e., to be connected to an external network is defined as a virtual network 1, and "net2", i.e., to be connected to an internal network SubnetA is defined as a virtual network 2. Moreover, in the "Web1 Server", to execute software "SW01" assigned "1" as an identifier is defined.

To return to FIG. 2, the software-template storage unit 14 is a storage unit that stores therein a template defining a value to be set in a parameter of software. A user describes a parameter value in the template stored in the software-template storage unit 14, thereby defining a value to be set in a software parameter. Furthermore, if the software parameter has a connection, the user describes a parameter value of a connection destination in a parameter value of a connection source. This allows the user to describe a variable by which the parameter value of the connection destination is referenced, and if there is a variable by which another parameter is referenced in the set parameter value, it is determined that there is a connection. Incidentally, the template can be defined by, for example, an XML (eXtensible Markup Language) structure.

FIG. 4 is a diagram illustrating an example of the template stored in the software-template storage unit. As illustrated in FIG. 4, the template of software is defined by at least one "parameter" defining a "key" and a "value". The "parameter" is for defining a parameter to be defined in software, and the "key" is for defining a name of the parameter, and the "value" is for defining a value to be set in the parameter, i.e., is for defining a reference value of the parameter. The reference value of the parameter is defined in an area behind "#".

To explain an example with FIG. 4, in a parameter "web.ap.connection.ipaddress" of "software 1" of "server1", "server[3].nic[1].ipaddress" is defined as a value to be set. Namely, it indicates that "server[3].nic[1].ipaddress" is set in "web.ap.connection.ipaddress" of the "SW01" assigned "1" as a software identifier on the "Web1 Server" assigned "1" as a server identifier.

To return to FIG. 2, the server-information storage unit 15 is a storage unit that stores therein information on a virtual server. The information stored here is stored by a configuration-information extracting unit 33 to be described later. FIG. 5 is a diagram illustrating an example of the information stored in the server-information storage unit. As illustrated in FIG. 5, the server-information storage unit 15 stores therein "server number" and "name" in an associated manner. The "server number" stored here is a server identifier for identifying a server, and corresponds to a value defined in "no" under "server" illustrated in FIG. 3. The "name" is a host name set in the server, and corresponds to a value defined in "name" under "server" illustrated in FIG. 3.

In the case of FIG. 5, it is indicated that the "Web1 Server" is given "1" as the server number, and a "Web2 Server" is given "2" as the server number. Furthermore, it is indicated that an "AP Server" is given "3" as the server number, and a "DB Server" is given "4" as the server number.

The NIC-information storage unit 16 is a storage unit that stores therein address information set in an NIC of a virtual server. The information stored here is stored by the configuration-information extracting unit 33 to be described later. FIG. 6 is a diagram illustrating an example of the information stored in the NIC-information storage unit. As illustrated in FIG. 6, the NIC-information storage unit 16 stores therein "server number", "NIC number", and "IP (Internet Protocol) address" in an associated manner.

The "server number" stored here is a server identifier for identifying a server, and corresponds to a value defined in "no" under "server" illustrated in FIG. 3. The "NIC number" is an interface identifier for identifying an NIC, and corresponds to a value defined in "no" of "vnics" under "server" illustrated in FIG. 3. The "IP address" is an IP address set in the NIC, and is set by the configuration-information extracting unit 33 to be described later.

In the case of FIG. 6, it is indicated that "192.168.1.2" is set as an IP address in an NIC assigned "NIC number=1" that "server number=1" has. Furthermore, it is indicated that "192.168.2.2" is set as an IP address in an NIC assigned "NIC number=2" that "server number=1" has. Namely, it is indicated that "192.168.1.2" is set in an NIC 1 of the Web1 Server, and "192.168.2.2" is set in an NIC 2 of the Web1 Server.

Moreover, it is indicated that "192.168.2.4" is set as an IP address in an NIC assigned "NIC number=1" that "server number=3" has. Furthermore, it is indicated that "192.168.3.2" is set as an IP address in an NIC assigned "NIC number=2" that "server number=3" has. Namely, it is indicated that "192.168.2.4" is set in an NIC 1 of the AP Server, and "192.168.3.2" is set in an NIC 2 of the AP Server. Incidentally, IP addresses and the like illustrated in FIG. 6 are examples, and numerical values are not limited to those illustrated in FIG. 6.

The software-information storage unit 17 is a storage unit that stores therein information on software that a virtual server executes. The information stored here is stored by the configuration-information extracting unit 33 to be described later. FIG. 7 is a diagram illustrating an example of the information stored in the software-information storage unit. As illustrated in FIG. 7, the software-information storage unit 17 stores therein "server number", "software number", and "parameter definition ID" in an associated manner.

The "server number" stored here is a server identifier for identifying a server, and corresponds to a value defined in "no" under "server" illustrated in FIG. 3. The "software number" is a software identifier for identifying software that a virtual server executes, and corresponds to a value defined in "no" of "software" under "server" illustrated in FIG. 3. The "parameter definition ID" is an identifier for identifying software in which a parameter is to be set, and corresponds to a value defined in "id" of "software" under "server" illustrated in FIG. 3.

In the case of FIG. 7, it is indicated that "SW01" is set as a parameter definition ID in software assigned "software number=1" that "server number=1" executes. Namely, the Web1 Server executes software set with "SW01". It is indicated that "SW01" is set as a parameter definition ID in software assigned "software number=1" that "server number=2" executes. Namely, the Web2 Server executes software set with "SW01".

Likewise, it is indicated that "SW02" is set as a parameter definition ID in software assigned "software number=1" that "server number=3" executes. Furthermore, it is indicated that "SW03" is set as a parameter definition ID in software assigned "software number=1" that "server number=4" executes. Namely, the AP Server executes software set with "SW02", and the DB Server executes software set with "SW03".

To return to FIG. 2, the software-parameter storage unit 18 is a storage unit that stores therein information on a parameter to be set in software. The information stored here is stored by the configuration-information extracting unit 33 to be described later. FIG. 8 is a diagram illustrating an example of the information stored in the software-parameter storage unit. As illustrated in FIG. 8, the software-parameter storage unit 18 stores therein "server number", "software number", "parameter key", and "parameter value" in an associated manner.

The "server number" stored here is a server identifier for identifying a server, and corresponds to a value set in "[*]" of "server[*].software[$] . . . " defined in "key" illustrated in FIG. 4. Incidentally, * and $ are integers. The "software number" is a software identifier for identifying software that a virtual server executes, and corresponds to a value set in "[$]" of "server[*].software[$] . . . " defined in "key" illustrated in FIG. 4. The "parameter key" indicates a name of a parameter to be set, and corresponds to a parameter described in " . . . " of "server[*].software[$] . . . " defined in "key" illustrated in FIG. 4.

In the case of FIG. 8, it is indicated that "web.ap.connection.ipaddress" is set as a parameter key in software assigned "software number=1" that "server number=1" executes, and "#{server[3].nic[1].ipaddress}" is set as a parameter value. Namely, it is indicated that "#{server[3].nic[1].ipaddress}" is set in the parameter "web.ap.connection.ipaddress" of "SW01" which is software on the Web1 Server.

Furthermore, it is indicated that "ap.connection.port" is set as a parameter key in software assigned "software number=1" that "server number=3" executes, and "9008" is set as a parameter value. Namely, it is indicated that "9008" is set in the parameter "ap.connection.port" of "SW02" which is software on the AP Server.

The software-connection storage unit 19 is a storage unit that stores therein a connection between software that a virtual server executes. Information stored here is stored by a connection extracting unit 34 to be described later. FIG. 9 is a diagram illustrating an example of the information stored in the software-connection storage unit. As illustrated in FIG. 9, the software-connection storage unit 19 stores therein "setting-side server number", "setting-side software number", "setting-side parameter key", "reference-side server number", "reference-side software number", and "reference-side parameter key" in an associated manner.

The "setting-side server number" stored here indicates a server identifier for identifying a server in which a parameter is to be set, and the "setting-side software number" indicates an identifier for identifying software on the server in which the parameter is to be set. The "setting-side parameter key" indicates a name of a parameter to be set in the setting-side software. Furthermore, the "reference-side server number" indicates a server identifier for identifying a server which is referenced as a parameter of the setting-side software, and the "reference-side software number" indicates a server identifier for identifying software which is referenced as a parameter of the setting-side software. The "reference-side parameter key" indicates a name of a parameter to be set in the reference-side software which is referenced on the setting-side.

In the case of FIG. 9, it is indicated that a software parameter "web.ap.connection.ipaddress" of software assigned "software number=1" that "server number=1" executes is set by reference to a parameter "nic[1].ipaddress" set in "server number=3". Namely, it is indicated that SW01 on the Web1 Server sets "nic[1].ipaddress" set in the AP Server in "web.ap.connection.ipaddress".

Furthermore, it is indicated that a software parameter "web.ap.connection.port" of the software assigned "software number=1" that "server number=1" executes is set by reference to a parameter "ap.connection.port" set in "software number=1" that "server number=3" executes. Namely, it is indicated that SW01 on the Web1 Server sets "ap.connection.port" set in SW02 on the AP Server in "web.ap.connection.port".

To return to FIG. 2, the server-OS-priority storage unit 20 is a storage unit that stores therein the order in which a parameter or the like is set in an OS of a virtual server and the order in which an OS of a virtual server is booted. Incidentally, information stored here is stored by a priority determining unit 35 to be described later. FIG. 10 is a diagram illustrating an example of the information stored in the server-OS-priority storage unit. As illustrated in FIG. 10, the server-OS-priority storage unit 20 stores therein "server number", "classification of connection", and "priority order" in an associated manner.

The "server number" stored here indicates an identifier of a virtual server subject to setting and start. The "classification of connection" indicates any of none, reference only, setting and reference, and setting only. Incidentally, reference only indicates that a virtual server is the one having a parameter referenced by other virtual servers; setting and reference indicates that a virtual server is the one having a parameter referenced by other virtual servers and a parameter not referenced by other virtual servers. Furthermore, setting only indicates that a virtual server is the one having a parameter not referenced by other virtual servers; none indicates that a virtual server is the one falling under none of reference only, setting and reference, and setting only. The "priority order" indicates the priority order of setting and start; the lower the number is, the higher the priority is.

In the case of FIG. 10, it is indicated that a virtual server given the highest priority of setting and start is a DB server which is assigned "server number=4" and classified as reference only. Furthermore, it is indicated that a virtual server given the second highest priority is an AP server which is assigned "server number=3" and classified as setting and reference. Moreover, it is indicated that a virtual server given the third highest priority is a Web2 server which is assigned "server number=2" and classified as setting only. Furthermore, it is indicated that a virtual server given the lowest priority is a Web1 server which is assigned "server number=1" and classified as setting only.

The software-priority storage unit 21 is a storage unit that stores therein the order in which a parameter or the like is set in software which a virtual server executes and the order in which software is activated. Incidentally, information stored here is stored by the priority determining unit 35 to be described later. FIG. 11 is a diagram illustrating an example of the information stored in the software-priority storage unit. As illustrated in FIG. 11, the software-priority storage unit 21 stores therein "server number", "software number", "classification of connection", and "priority order" in an associated manner.

The "server number" stored here indicates an identifier of a virtual server that executes software subject to setting and start; the "software number" indicates an identifier of the software subject to setting and start. The "classification of connection" indicates any of none, reference only, setting and reference, and setting only. Incidentally, reference only indicates that software is the one having a parameter referenced by other software; setting and reference indicates that software is the one having a parameter referenced by other software and a parameter not referenced by other software. Furthermore, setting only indicates that software is the one having a parameter not referenced by other software; none indicates that software is the one falling under none of reference only, setting and reference, and setting only. The "priority order" indicates the priority order of setting and start; the lower the number is, the higher the priority is.

In the case of FIG. 11, it is indicated that software given the highest priority of setting and start is "SW03" assigned "software number=1" that a DB server, which is assigned "server number=4" and classified as reference only, executes. Furthermore, it is indicated that software given the second highest priority is "SW02" assigned "software number=1" that an AP server, which is assigned "server number=3" and classified as setting and reference, executes. Moreover, it is indicated that software given the third highest priority is "SW01" assigned "software number=1" that a Web2 server, which is assigned "server number=2" and classified as setting only, executes. Furthermore, it is indicated that software given the lowest priority is "SW01" assigned "software number=1" that a Web1 server, which is assigned "server number=1" and classified as setting only, executes.

To return to FIG. 2, the control unit 30 is a processing unit that executes an OS or the like and controls the entire setting control device 10, and is, for example, an electronic circuit such as a central processing unit (CPU). The control unit 30 includes an information accepting unit 31, a system-deployment control unit 32, the configuration-information extracting unit 33, the connection extracting unit 34, the priority determining unit 35, and a start control unit 36, and constructs a virtual system with these units.

The information accepting unit 31 is a processing unit that transmits a system template or a software template to a user terminal upon receipt of a request for system construction from the user terminal and accepts system configuration information. For example, the information accepting unit 31 displays a system template stored in the system-template storage unit 13 as a Web screen on the user terminal, and accepts configuration information, such as an "id" and a "name" of a "server" and "no" and an "id" of "software", through the Web screen. Then, the information accepting unit 31 stores the system template in which the configuration information has been described in the system-template storage unit 13. Incidentally, the system template is defined in servers in the order from a server closest to an external network in the system.

Furthermore, the information accepting unit 31 displays a software template stored in the software-template storage unit 14 as a Web screen on the user terminal, and accepts configuration information, such as a "key" and a "value", through the Web screen. Then, the information accepting unit 31 stores the software template in which the configuration information has been described in the software-template storage unit 14. Incidentally, the software template is defined in servers in the order from a server closest to an external network in the system.

The system-deployment control unit 32 is a processing unit that deploys a system specified by a user on a physical server. For example, the system-deployment control unit 32 detects that the system-template storage unit 13 or the software-template storage unit 14 has been updated. Upon detection of the update, the system-deployment control unit 32 deploys each "server" defined in the system-template storage unit 13 on a cloud system. Namely, the system-deployment control unit 32 reserves an area in which each "server" defined in the system-template storage unit 13 can operate using physical resources existing in the cloud system.

The configuration-information extracting unit 33 is a processing unit that reads out information stored in the system-template storage unit 13 or the software-template storage unit 14 from the beginning and extracts server information, NIC information, software information, and software parameter information. As a point of the start, when the configuration-information extracting unit 33 is notified of initiation of a process by the information accepting unit 31, or when the configuration-information extracting unit 33 has detected that the system-template storage unit 13 or the software-template storage unit 14 has been updated, the configuration-information extracting unit 33 is activated. Here, information extracted by the configuration-information extracting unit 33 is explained. Incidentally, the configuration-information extracting unit 33 performs a process to be described below with reference to definitions in the order from the beginning of the system template.

Extraction of Server Information

The configuration-information extracting unit 33 extracts information on a server from the template which has been stored in the system-template storage unit 13 and contains the system configuration described by a user, and stores the extracted information in the server-information storage unit 15. An example of the information extracted by the configuration-information extracting unit 33 is explained with reference to FIG. 3. The configuration-information extracting unit 33 extracts "1" defined in "no" under "server" and "Web1 Server" defined in "name". Then, the configuration-information extracting unit 33 stores the extracted "1, Web1 Server" as "server number, name" in the server-information storage unit 15. Likewise, the configuration-information extracting unit 33 performs the same process with respect to each of a Web2 Server, an AP Server, and a DB server, and extracts "server number, name" from the system template and stores the extracted information in the server-information storage unit 15.

Assignment to NIC

The configuration-information extracting unit 33 assigns an IP address to an NIC of each virtual server defined in the system template, and stores information on the assigned IP address in the NIC-information storage unit 16. For example, to explain with reference to FIG. 3, the configuration-information extracting unit 33 extracts "1" defined in "no" under "server" and "net1" and "net2" which are defined in "vnics" under "server". Then, the configuration-information extracting unit 33 stores the extracted "1, net1" and "1, net2" as "server number, NIC number" in the NIC-information storage unit 16. After that, the configuration-information extracting unit 33 assigns an IP address "192.168.1.2" to "net1", and assigns an IP address "192.168.2.2" to "net2". Then, the configuration-information extracting unit 33 stores the assigned IP addresses in the NIC-information storage unit 16 in a manner associated with the respective NIC numbers Incidentally, the configuration-information extracting unit 33 performs the same process with respect to each of the Web2 Server, the AP Server, and the DB server, and generates "server number, NIC number, IP address". Furthermore, the configuration-information extracting unit 33 can be configured to store therein IP address ranges which can be used in DMZ, SubnetA, and SubnetB, respectively, and identify a network to be used by each NIC number from the system template and assign an unused IP address.

Extraction of Software Information

The configuration-information extracting unit 33 extracts information on software from the template which has been stored in the system-template storage unit 13 and contains the system configuration described by a user, and stores the extracted information in the software-information storage unit 17. An example of the information extracted by the configuration-information extracting unit 33 is explained with reference to FIG. 3. The configuration-information extracting unit 33 extracts "1" defined in "no" under "server", "1" defined in "no" under "software", and "SW01" defined in "id" under the "software". Then, the configuration-information extracting unit 33 stores the extracted "1, 1, SW01" as "server number, software number, parameter definition ID" in the software-information storage unit 17. Incidentally, the configuration-information extracting unit 33 performs the same process with respect to each of the Web2 Server, the AP Server, and the DB server, and extracts "server number, software number, parameter definition ID" from the system template and stores the extracted information in the software-information storage unit 17.

Extraction of Software Parameter Information

The configuration-information extracting unit 33 extracts a parameter from the template which has been stored in the software-template storage unit 14 and described by a user, and stores the extracted parameter in the software-parameter storage unit 18. To explain this specifically with reference to FIG. 4, the configuration-information extracting unit 33 extracts "key=server[1].software[1].web.ap.connection.ipaddress" and "value=#{server[3].nic[1].ipaddress}" from the template stored in the software-template storage unit 14. Then, in accordance with the extracted key, the configuration-information extracting unit 33 extracts server number=1 from server[1], extracts software number=1 from software[1], extracts a parameter key=web.ap.connection.ipaddress, and extracts a parameter value=value=#{server[3].nic[1].ipaddress}. After that, the configuration-information extracting unit 33 stores the extracted information in the software-parameter storage unit 18 in an associated manner. Incidentally, the configuration-information extracting unit 33 performs the same process with respect to each of the other "key, value" illustrated in FIG. 4.

To return to FIG. 2, the connection extracting unit 34 is a processing unit that extracts a connection between software executed by virtual servers on the basis of information stored in the software-parameter storage unit 18 and stores information on the extracted connection in the software-connection storage unit 19. There is explained an example where information to be stored in the software-connection storage unit 19 illustrated in FIG. 9 is generated from, for example, information which has been generated and stored in the software-parameter storage unit 18 illustrated in FIG. 8 by the configuration-information extracting unit 33.

The connection extracting unit 34 reads "server number=1, software number=1, parameter key=web.ap.connection.ipaddress, parameter value=#{server[3].nic[1].ipaddress}" in the first line in FIG. 8. Then, the connection extracting unit 34 determines that "ipaddress" assigned to "nic1" of "server number=3" is set in "web.ap.connection.ipaddress" which is a parameter of "software number=1" on "server number=1". As a result, the connection extracting unit 34 determines that the side of setting a parameter is "server number=1, software number=1" and the side of being referenced is a parameter "nic[1].ipaddress" of "server number=3". Therefore, as illustrated in the first line in FIG. 9, the connection extracting unit 34 stores "1, 1, web.ap.connection.ipaddress, 3, -, nic[1].ipaddress" in the software-connection storage unit 19.

To explain another example, the connection extracting unit 34 reads "server number=1, software number=1, parameter key=web.ap.connection.port, parameter value=#{server[3].software[1].ap.connection.port}" in the second line in FIG. 8. Then, the connection extracting unit 34 determines that "ap.connection.port" set in "software number=1" of "server number=3" is set in "web.ap.connection.port" which is a parameter of "software number=1" on "server number=1". As a result, the connection extracting unit 34 determines that the side of setting a parameter is "server number=1, software number=1" and the side of being referenced is a parameter "ap.connection.port" of "server number=3, software number=1". Therefore, as illustrated in the second line in FIG. 9, the connection extracting unit 34 stores "1, 1, web.ap.connection.port, 3, 1, ap.connection.port" in the software-connection storage unit 19.

To explain still another example, the connection extracting unit 34 reads "server number=3, software number=1, parameter key=ap.db.jdbc.url, parameter value=#{server[4].nic[1].ipaddress}, #{server[4].software[1].db.port}" in the fifth line in FIG. 8. Then, the connection extracting unit 34 determines that "ipaddress" assigned to "nic1" of "server number=4" is set in "ap.db.jdbc.url" which is a parameter of "software number=1" on "server number=3". Furthermore, the connection extracting unit 34 determines that "db.port" set in "software number=1" of "server number=4" is set in "ap.db.jdbc.url" which is a parameter of "software number=1" on "server number=4".

As a result, the connection extracting unit 34 determines that the side of setting a parameter is "server number=3, software number=1" and the side of being referenced is a parameter "nic[1].ipaddress" of "server number=4". Furthermore, the connection extracting unit 34 determines that the side of setting a parameter is "server number=3, software number=1" and the side of being referenced is a parameter "db.port" of "server number=4, software number=1". Therefore, as illustrated in the fifth line in FIG. 9, the connection extracting unit 34 stores "3, 1, ap.db.jdbc.url, 4, -, nic[1].ipaddress" in the software-connection storage unit 19. Furthermore, as illustrated in the sixth line in FIG. 9, the connection extracting unit 34 stores "3, 1, ap.db.jdbc.url, 4, 1, db.port" in the software-connection storage unit 19.

To return to FIG. 2, the priority determining unit 35 is a processing unit that determines the server OS priority order and the software priority order and stores the determined priority orders in the server-OS-priority storage unit 20 and the software-priority storage unit 21, respectively. Here, a case of determining the server OS priority order and a case of determining the software priority order are explained.

Server OS Priority Order

The priority determining unit 35 determines the priority order using the storing order in which server numbers have been stored in the server-information storage unit 15 and the classification of server connection. The order of default server priority is the order opposite to the storing order in which server numbers have been stored in the server-information storage unit 15; in other words, the farther server from the external network, the higher priority is assigned. In the case of FIG. 1, the priority determining unit 35 sets the default priority order in the order of the DB server, the AP server, and the Web server.

Furthermore, a line set with no reference-side software number in the software-connection storage unit 19 is that refers to a parameter of a server OS. A connection is classified by determining a value of this line as follows. Specifically, the priority determining unit 35 determines a connection as "setting only" with respect to a virtual server falling under only setting-side server number in the software-connection storage unit 19. Furthermore, the priority determining unit 35 determines a connection as "reference only" with respect to a virtual server falling under only reference-side server number in the software-connection storage unit 19. The priority determining unit 35 determines a connection of a virtual server falling under both setting-side server number and reference-side server number in the software-connection storage unit 19 as "setting and reference". The priority determining unit 35 determines a connection of a virtual server falling under neither setting-side server number nor reference-side server number in the software-connection storage unit 19 as "none".

An example of how to create the table illustrated in FIG. 10 is explained with reference to FIGS. 5, 8, and 9. The priority determining unit 35 recognizes that the storing order in which server numbers have been stored in the server-information storage unit 15 is the order of "server number=1", "server number=2", "server number=3", and "server number=4" as illustrated in FIG. 5. Therefore, the priority determining unit 35 recognizes that the default priority order is the order of "server number=4", "server number=3", "server number=2", and "server number=1" in descending order of default priority.

After that, with reference to FIG. 9, "server number=4" is stored only in "reference-side server number", so the priority determining unit 35 determines the classification of connection of "server number=4" as "reference only" and stores the determined classification in the server-OS-priority storage unit 20 as illustrated in FIG. 10. Likewise, with reference to FIG. 9, "server number=3" is stored in "setting-side server number" and "reference-side server number", so the priority determining unit 35 determines the classification of connection of "server number=3" as "setting and reference" and stores the determined classification in the server-OS-priority storage unit 20. Furthermore, with reference to FIG. 9, "server number=2" is stored only in "setting-side server number", so the priority determining unit 35 determines the classification of connection of "server number=2" as "setting only" and stores the determined classification in the server-OS-priority storage unit 20. Likewise, with reference to FIG. 9, "server number=1" is stored only in "setting-side server number", so the priority determining unit 35 determines the classification of connection of "server number=1" as "setting only" and stores the determined classification in the server-OS-priority storage unit 20.

Then, the priority determining unit 35 sets the priority order in such a way that a priority of a server of which the connection state is classified as "none" is highest, followed by that classified as "reference only", that classified as "setting and reference", and that classified as "setting only". Furthermore, if there are multiple servers falling under the same classification of connection, the priority determining unit 35 assigns a higher priority to a server given a higher default priority. As a result, the priority determining unit 35 can determine the priority order in the order of "server number=4", "server number=3", "server number=2", and "server number=1" and store the determined priority order in the server-OS-priority storage unit 20 as illustrated in FIG. 10.

Software Priority Order

The priority determining unit 35 determines the priority order of the setting and start among software using the priority order stored in the server-OS-priority storage unit 20 and the classification of software connection. The default software priority order is the order combining the storing order in which server numbers have been stored in the server-OS-priority storage unit 20 and the storing order in which software has been stored in the software-information storage unit 17.

Namely, when multiple high-priority software is executed by one server based on the storing order in which servers have been stored in the server-OS-priority storage unit 20, a higher priority is given to software in the storing order in which software has been stored in the software-information storage unit 17. In the case of the above-described embodiment, software executed by server number=4 having the highest priority in FIG. 10 is given the highest default priority, followed by that executed by server number=3, that executed by server number=2, and that executed by server number=1.

An example of how to create the table illustrated in FIG. 11 is explained with reference to FIGS. 7, 9, and 10. The priority determining unit 35 recognizes that the storing order in which server numbers have been stored in the server-OS-priority storage unit 20 is the order of "server number=4", "server number=3", "server number=2", and "server number=1" with reference to FIG. 10. Therefore, the priority determining unit 35 determines the order of determination of the software priority order as the order of "server number=1", "server number=2", "server number=3", and "server number=4" in ascending order of default priority.

Then, with reference to FIG. 9, "software number=1" of "server number=1" is stored only in "setting-side software number", so the priority determining unit 35 determines the classification of connection of "software number=1" of "server number=1" as "setting only". Furthermore, with reference to FIG. 9, "software number=1" of "server number=2" is stored only in "setting-side software number", so the priority determining unit 35 determines the classification of connection of "software number=1" of "server number=2" as "setting only". With reference to FIG. 9, "software number=1" of "server number=3" is stored in "setting-side software number" and "reference-side software number", so the priority determining unit 35 determines the classification of connection of "software number=1" of "server number=3" as "setting and reference". Furthermore, with reference to FIG. 9, "software number=1" of "server number=4" is stored only in "reference-side software number", so the priority determining unit 35 determines the classification of connection of "software number=1" of the "server number=4" as "reference only".

Then, the priority determining unit 35 sets the priority order in such a way that a priority of software of which the connection state is classified as "none" is highest, followed by that classified as "reference only", that classified as "setting and reference", and that classified as "setting only". Furthermore, if there is multiple software falling under the same classification of connection, the priority determining unit 35 assigns a higher priority to software given a higher default priority. As a result, the priority determining unit 35 determines the priority order in the order of "software number=1 of server number=4", "software number=1 of server number=3", "software number=1 of server number=2", and "software number=1 of server number=1" as illustrated in FIG. 11. Namely, the priority determining unit 35 can assign priorities "1", "2", "3", and "4" in the above order and store the determined priorities in the software-priority storage unit 21 as illustrated in FIG. 11.

To return to FIG. 2, the start control unit 36 is a processing unit that sets respective operating conditions of virtual servers in accordance with the server OS priority order determined by the priority determining unit 35 and starts the operation of each virtual server. Furthermore, the start control unit 36 is a processing unit that sets a parameter for activating software in accordance with the software priority order determined by the priority determining unit 35 and starts the operation of software.

Specifically, the start control unit 36 performs the setting with respect to an OS or the like of a server and starts the OS, and performs the setting and start of software. Incidentally, the setting with respect to an OS or the like of a server is, for example, to reserve a resource such as a processor or a memory for operating a virtual server and to save an OS image of the virtual server on a physical server. Furthermore, it also includes to set a host name, an IP address, and the like used by the virtual server. The setting with respect to software is, for example, to set a host name and IP address of the virtual server in software and to set a port number or the like for communication of the software with other software or the like.

The start control unit 36 controls the above-described setting and start using a script. The script calls a software-specific command or the like. This absorbs a different specification among software and plays a role in eliminating dependency. Definitions of a parameter and a method specify a name and a type of value. A software-specific script is also defined. This script contains, for example, a software-specific command and an instruction to designate a value specified in a parameter as an argument. By defining a specification for connection of software as a parameter in this way, an interface between software is unified.

FIG. 12 is a diagram illustrating an example of a parameter and method defined in a script. As illustrated in FIG. 12, as for software assigned a parameter definition ID "SW01" on a Web server, "script_web.zip" is executed. In the script "script_web.zip", a string-type "web.ap.connection.ipaddress" for setting an IP address of a connection destination and a number-type "web.ap.connection.port" for setting a connection destination port can be defined. Furthermore, a method indicating operation, such as start, exit, or restart, can be executed by the script "script_web.zip".

Furthermore, as for software assigned a parameter definition ID "SW02" on an AP server, "script_ap.zip" is executed. In the script "script_ap.zip", a string-type "ap.connection.port" for setting an AP connection port and a string-type "ap.db.jdbc.driver" for setting a JDBC (Java™ Database Connection) driver can be defined. In the script "script_ap.zip", a string-type "ap.db.jdbc.url" for setting a connection destination of JDBC can be defined. Furthermore, a method indicating operation, such as start, exit, or restart, can be executed by the script "script_ap.zip".

Moreover, as for software assigned a parameter definition ID "SW03" on a DB server, "script_db.zip" is executed. In the script "script_db.zip", a string-type "db.port" for setting a DB connection port can be defined. Furthermore, a method indicating operation, such as start, exit, or restart, can be executed by the script "script_db.zip".

Incidentally, "nic.[nic No].ipaddress" defined in each script specifies a value stored in the NIC-information storage unit 16. Furthermore, a software parameter defined in each script, such as "web.ap.connection.port", specifies a value stored in the software-parameter storage unit 18. Incidentally, the start control unit 36 defines a script, for example, like "web_setup -ip %ap.connection.ipaddress% -port %ap.connection.port%", and executes the script.

Flow of Process

Subsequently, processes performed by the setting control device 10 according to the second embodiment are explained.

Here, an overall process performed by the setting control device 10 is explained first, and after that, detailed processes are sequentially explained.

Flow of Overall Process

Figure 13:
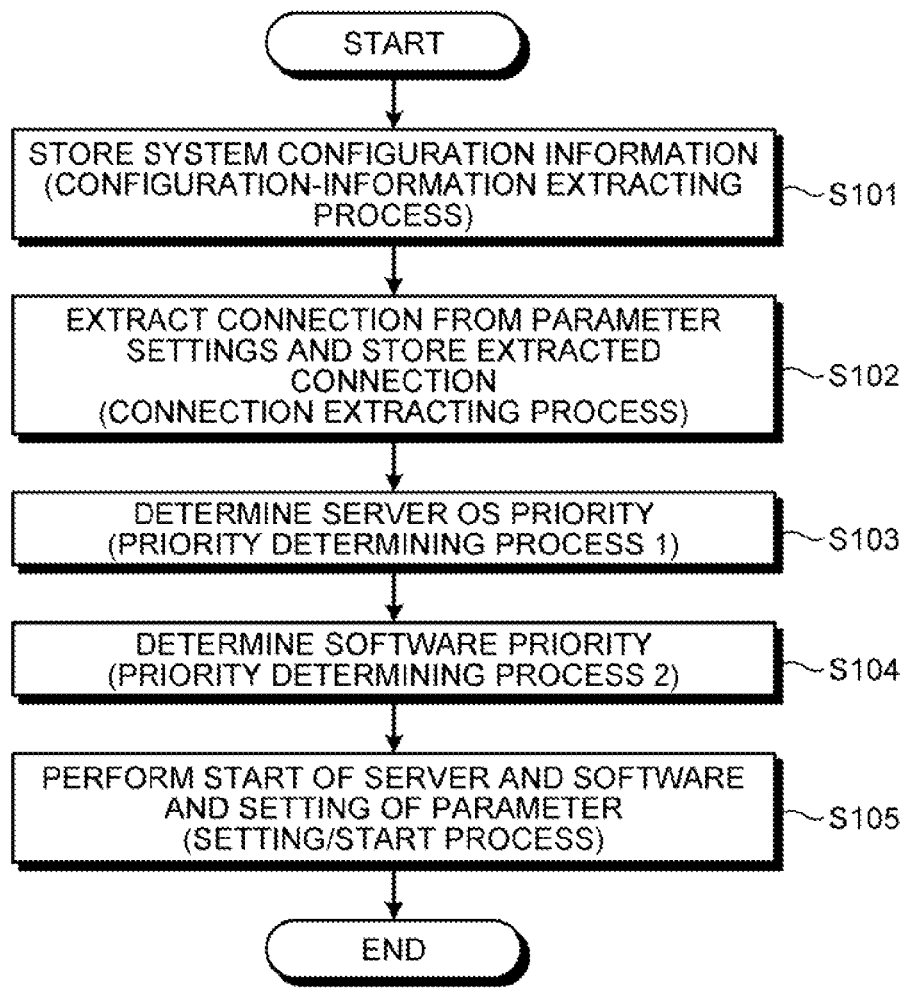
FIG. 13 is a flowchart illustrating an overall flow of a process performed by the setting control device according to the second embodiment.

FIG. 13 is a flowchart illustrating an overall flow of a process performed by the setting control device according to the second embodiment. As illustrated in FIG. 13, the setting control device 10 performs a configuration-information extracting process for extracting system configuration information from information which has been set in a system template by a user who requested deployment of a system and storing the extracted system configuration information (Step S101). Incidentally, the setting control device 10 deploys the system that the user requested either before or after Step S101.

Then, the setting control device 10 performs a connection extracting process for extracting a connection between software implemented on virtual servers on the basis of the information which has been set in the system template by the user who requested deployment of a system and storing the extracted connection (Step S102).

Then, the setting control device 10 performs a priority determining process 1 for determining the OS setting order and the OS starting order among servers (Step S103), and performs a priority determining process 2 for determining the setting order and the starting order among software (Step S104).

After that, the setting control device 10 performs the setting and start of a server OS, hardware, and software in accordance with the order determined at Steps S103 and S104 (Step S105). In doing this way, the setting control device 10 sets a parameter in an operating condition of a virtual server or virtual server software, etc. and makes the whole system operate properly, and provides the system to the user.

Flow of Configuration-Information Extracting Process

Figure 14:
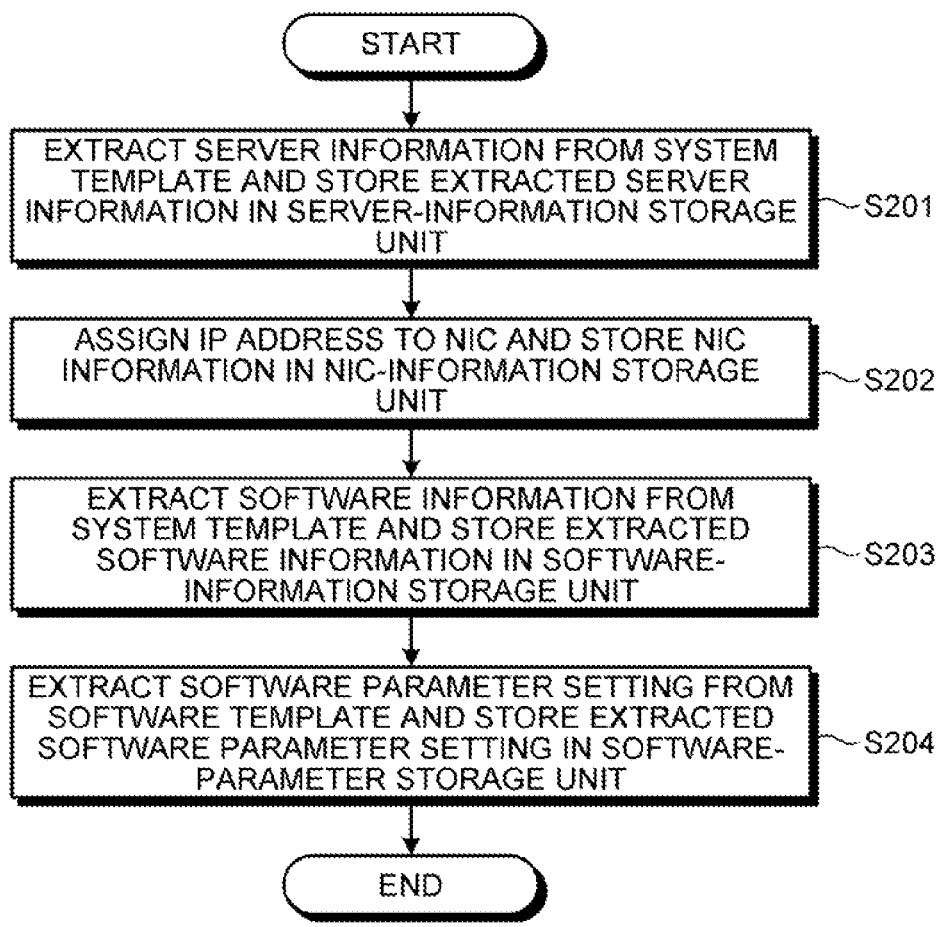
FIG. 14 is a flowchart illustrating a flow of a configuration-information extracting process performed by the setting control device according to the second embodiment.

FIG. 14 is a flowchart illustrating a flow of the configuration-information extracting process performed by the setting control device according to the second embodiment. Incidentally, the process to be performed here is performed at Step S101 in FIG. 13.

As illustrated in FIG. 14, the configuration-information extracting unit 33 of the setting control device 10 extracts virtual server information set by a user from a system template stored in the system-template storage unit 13, and stores the extracted virtual server information in the server-information storage unit 15 (Step S201).

Then, the configuration-information extracting unit 33 assigns an IP address to an NIC of each virtual server which has been defined in the system template by the user and stored in the system-template storage unit 13, and stores information on the assignment and the like in the NIC-information storage unit 16 (Step S202).

Then, the configuration-information extracting unit 33 extracts information on user-defined software from the system template stored in the system-template storage unit 13, and stores the extracted information in the software-information storage unit 17 (Step S203).

After that, the configuration-information extracting unit 33 extracts a user-defined software parameter from a template stored in the software-template storage unit 14, and stores the extracted software parameter in the software-parameter storage unit 18 (Step S204).

In this manner, by executing Steps S201 to S204, the configuration-information extracting unit 33 can create the server-information storage unit 15, the NIC-information storage unit 16, the software-information storage unit 17, and the software-parameter storage unit 18 illustrated in FIGS. 5 to 8, respectively.

Flow of Connection Extracting Process

Figure 15:
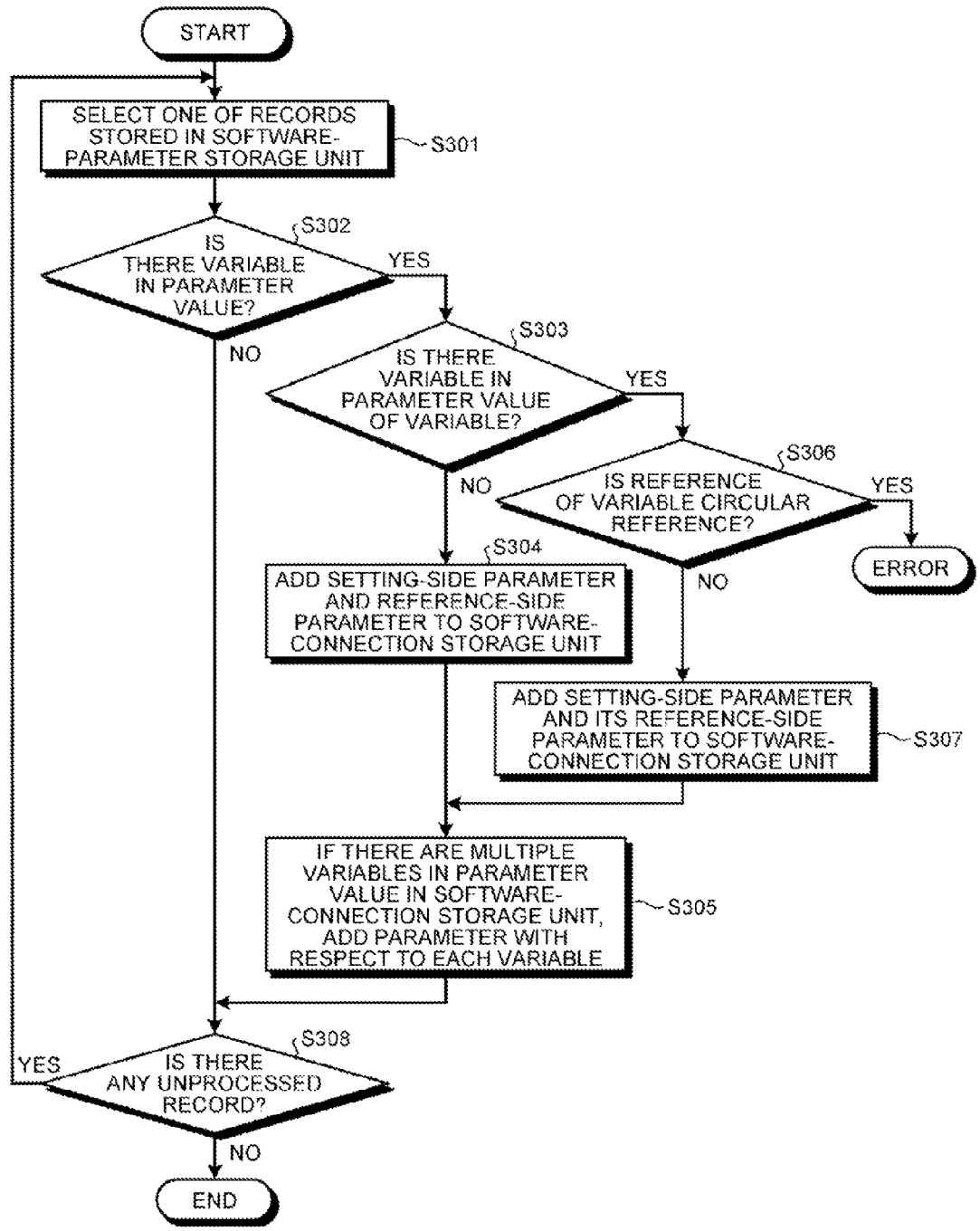
FIG. 15 is a flowchart illustrating a flow of a connection extracting process performed by the setting control device according to the second embodiment.

FIG. 15 is a flowchart illustrating a flow of the connection extracting process performed by the setting control device according to the second embodiment. Incidentally, the process to be performed here is performed at Step S102 in FIG. 13.

As illustrated in FIG. 15, the connection extracting unit 34 of the setting control device 10 selects one of records stored in the software-parameter storage unit 18 sequentially from the beginning (Step 301), and determines whether a parameter value of the selected record contains a variable (Step S302). Namely, the connection extracting unit 34 determines whether there is a connection between software. Incidentally, the connection extracting unit 34 selects one record on top of records which have not yet subjected to the process illustrated in FIG. 15 out of the records stored in the software-parameter storage unit 18.

When determined that a parameter value of the selected record contains a variable (YES at Step S302), the connection extracting unit 34 determines whether the variable parameter value contains a further variable (Step S303).

Here, an example where the connection extracting unit 34 determines whether there is a further variable in the variable parameter value is explained. FIG. 16 is a diagram illustrating an example of the software-parameter storage unit for explaining whether there is a further variable in the variable parameter value. The example illustrated in FIG. 16 indicates that a parameter "web.ap.connection.port" set in "software number=1" of "server number=1" refers to "ap.connection.port" set in "software number=1" of "server number=3". Furthermore, it indicates that a value of the parameter "ap.connection.port" set in the "software number=1" of "server number=3" is a fixed value "9008".

In this case, the connection extracting unit 34 determines that the parameter "web.ap.connection.port" set in "software number=1" of "server number=1" refers to "ap.connection.port" set in "software number=1" of "server number=3". Furthermore, the connection extracting unit 34 determines that a value of referent "ap.connection.port" set in "software number 1" of "server number=3" is not a variable but a fixed value "9008". As a result, the connection extracting unit 34 determines that the parameter "web.ap.connection.port" set in "software number=1" of "server number=1" contains no further variable. On the other hand, if a further referent is specified in "ap.connection.port" set in "software number=1" of "server number=3", the connection extracting unit 34 determines that there is a further variable in "web.ap.connection.port".

To return to FIG. 15, when determined that the variable parameter value contains no further variable (NO at Step S303), the connection extracting unit 34 performs Step S304 in accordance with information stored in the read record. Namely, in accordance with the parameter value of the read record, the connection extracting unit 34 stores the setting-side server number, software number, and parameter key and the reference-side server number, software number, and parameter key in the software-connection storage unit 19. At this time, the connection extracting unit 34 adds a new record to the bottom of the software-connection storage unit 19.

Furthermore, if the parameter value of the read record contains multiple variables, the connection extracting unit 34 adds as many records as the number of variables to the software-connection storage unit 19 (Step S305). For example, when there are multiple variables beginning with "#" in the parameter value as in the fifth line in FIG. 8, the connection extracting unit 34 stores a connection with respect to each variable, i.e., each of the variables beginning with "#".

On the other hand, when determined that the variable parameter value contains a further variable (YES at Step S303), the connection extracting unit 34 determines whether a reference of the variable contained in the parameter value is a circular reference (Step S306). Specifically, the connection extracting unit 34 determines whether there is a variable in the parameter value not only once but more than once repeatedly as long as there is a variable in the parameter value. Then, if a parameter referring to a variable is the previously-referenced parameter, the connection extracting unit 34 determines that a reference of the variable is a circular reference.

Here, an example of how to determine whether a reference of a variable is a circular reference is explained. FIG. 17 is a diagram illustrating the software-parameter storage unit indicating an example where a reference of a variable is not a circular reference, and FIG. 18 is a diagram illustrating the software-parameter storage unit indicating an example where a reference of a variable is a circular reference. The example illustrated in FIG. 17 indicates that a parameter "web.ap.connection.port" set in "software number=1" of "server number=1" refers to "web.ap.connection.port" set in "software number=1" of "server number=2". Furthermore, it indicates that a parameter "web.ap.connection.port" set in "software number=1" of "server number=2" refers to "ap.connection.port" set in "software number=1" of "server number=3". Moreover, it indicates that a parameter "ap.connection.port" set in "software number=1" of "server number=3" refers to a fixed value "9008".

In the case of FIG. 17, a parameter value in the first line is "#{server[2].software[1].web.ap.connection.port}". This refers to a parameter in the second line. A parameter value in the second line is "#{server[3].software[1].ap.connection.port}". This refers to a parameter in the third line. A parameter value in the third line is "9008". In this manner, in the example illustrated in FIG. 17, any previously-referenced parameter does not appear in the first to third lines, so the connection extracting unit 34 determines that it is not a circular reference.

The example illustrated in FIG. 18 indicates that a parameter "web.ap.connection.port" set in "software number=1" of "server number=1" refers to "web.ap.connection.port" set in "software number=1" of "server number=2". Furthermore, it indicates that a parameter "web.ap.connection.port" set in "software number=1" of "server number=2" refers to "ap.connection.port" set in "software number=1" of "server number=3". Moreover, it indicates that a parameter "ap.connection.port" set in "software number=1" of "server number=3" refers to "web.ap.connection.port" set in "software number=1" of "server number=1".

In the case of FIG. 18, a parameter value in the first line is "#{server[2].software[1].web.ap.connection.port}". This refers to a parameter in the second line. A parameter value in the second line is "#{server[3].software[1].ap.connection.port}". This refers to a parameter in the third line. A parameter value in the third line is "#{server[1].software[1].ap.connection.port}". This refers to the previously-referenced parameter in the first line. Therefore, the connection extracting unit 34 determines that it is a circular reference.

To return to FIG. 15, when determined that a reference of the variable contained in the parameter value is a circular reference (YES at Step S306), the connection extracting unit 34 determines that there is an error in the parameter settings and outputs a message of the error to the display or a user terminal.

On the other hand, when determined that a reference of the variable contained in the parameter value is not a circular reference (NO at Step S306), the connection extracting unit 34 performs Step S307 and then Step S305 in accordance with the information stored in the read record. Namely, in accordance with the parameter value of the read record, the connection extracting unit 34 stores the setting-side server number, software number, and parameter key in the software-connection storage unit 19. Furthermore, the connection extracting unit 34 stores the last referenced server number, software number, and parameter key as the reference-side information in the software-connection storage unit 19. Incidentally, at this time also, the connection extracting unit 34 adds a new record to the bottom of the software-connection storage unit 19.

After that, if there is any record which has not yet subjected to the above-described process out of the records stored in the software-parameter storage unit 18 (YES at Step S308), return to Step S301, the connection extracting unit 34 repeatedly performs the process from Step S301. On the other hand, when there is no record which has not yet subjected to the above-described process out of the records stored in the software-parameter storage unit 18 (NO at Step S308), the connection extracting unit 34 ends the process.

Flow of Priority Determining Process 1

FIG. 19 is a flowchart illustrating a flow of the priority determining process 1 performed by the setting control device according to the second embodiment. Incidentally, the process performed here is that performed at Step S103 in FIG. 13. Furthermore, here, priorities among servers are determined in such a way that a priority of a server of which the connection state is classified as "none" is highest, followed by that classified as "reference only", that classified as "setting and reference", and that classified as "setting only". Namely, records are stored in the server-OS-priority storage unit 20 in such a way that a "none" record group is stored on top of the table, followed by a "reference only" record group, a "setting and reference" record group, and finally a "setting only" record group. Incidentally, the record group indicates zero or more records, and it doesn't matter if any of the record groups is absent.

As illustrated in FIG. 19, the priority determining unit 35 of the setting control device 10 selects one record on top of stored records which have not yet subjected to the process illustrated in FIG. 19 out of the records stored in the server-information storage unit 15 as an object of which the priority is to be determined (Step S401).

Then, the priority determining unit 35 classifies a server-to-server connection of the selected record, i.e., a virtual server of which the priority is to be determined with reference to the software-connection storage unit 19 (Step S402).

Then, when classified the server-to-server connection as "setting only", the priority determining unit 35 adds the server number of the virtual server of which the priority is to be determined to the server-OS-priority storage unit 20 as a record on top of records falling under the classification of "setting only" (Step S403). As a result, the newly-stored server number has the highest priority in those falling under the classification of "setting only".

Furthermore, when classified the server-to-server connection as "setting and reference", the priority determining unit 35 determines whether a default priority of the server is higher than those of servers stored under the classification of "setting and reference" in the server-OS-priority storage unit 20 (Step S404). Namely, the priority determining unit 35 determines whether the server number of which the priority is currently determined has been stored on the bottom side of the server-information storage unit 15 than server numbers which have already been stored under "setting and reference".

Then, when the default priority of the server number of which the priority is currently determined is higher than those of the already-stored server numbers (YES at Step S404), the priority determining unit 35 performs Step S405. Namely, the priority determining unit 35 adds the server number of which the priority is to be determined to the server-OS-priority storage unit 20 as a record on top of records falling under the classification of "setting and reference". As a result, the newly-stored server number has the highest priority in those falling under the classification of "setting and reference".

On the other hand, when the default priority of the server number of which the priority is currently determined is lower than those of the already-stored server numbers (NO at Step S404), the priority determining unit 35 performs Step S406. Namely, the priority determining unit 35 adds the server number of which the priority is to be determined to the server-OS-priority storage unit 20 as a record falling under the classification of "setting and reference" with a reshuffling of priorities. That is, the priority determining unit 35 adds the server number of which the priority is to be determined as server number following the already-stored server numbers so that priorities of the already-stored server numbers are higher than that of the added server number. As a result, the already-stored server numbers have higher priorities than that of the newly-stored server number.

Moreover, when classified the server-to-server connection as "reference only", the priority determining unit 35 adds the server number of which the priority is to be determined to the server-OS-priority storage unit 20 as a record on top of records falling under the classification of "reference only" (Step S407). As a result, the newly-stored server number has the highest priority in those falling under the classification of "reference only".

Furthermore, when classified the server-to-server connection as "none", the priority determining unit 35 adds the server number of which the priority is to be determined to the server-OS-priority storage unit 20 as a record on top of records falling under the classification of "none" (Step S408). As a result, the newly-stored server number has the highest priority in those falling under the classification of "none".

Then, after execution of the above Steps S403 to S408, if there is any record which has not yet subjected to the process illustrated in FIG. 19 out of the records stored in the server-information storage unit 15 (YES at Step S409), return to Step S401, the priority determining unit 35 repeatedly performs the process from Step S401. On the other hand, when there is no record which has not yet subjected to the process illustrated in FIG. 19 out of the records stored in the server-information storage unit 15 (NO at Step S409), the priority determining unit 35 ends the process.

Incidentally, after the end of the process from Step S401 to Step S409, server numbers have been stored in the server-OS-priority storage unit 20 in descending order of priority, so after the end of the process from Step S401 to Step S409, the priority determining unit 35 can assign priorities to the server numbers and store the assigned priorities. Furthermore, during the execution of the process from Step S401 to Step S409, the priority determining unit 35 can assign priorities to the stored server numbers and store the assigned priorities each time server number is stored in the server-OS-priority storage unit 20.

Flow of Priority Determining Process 2

Figure 20:
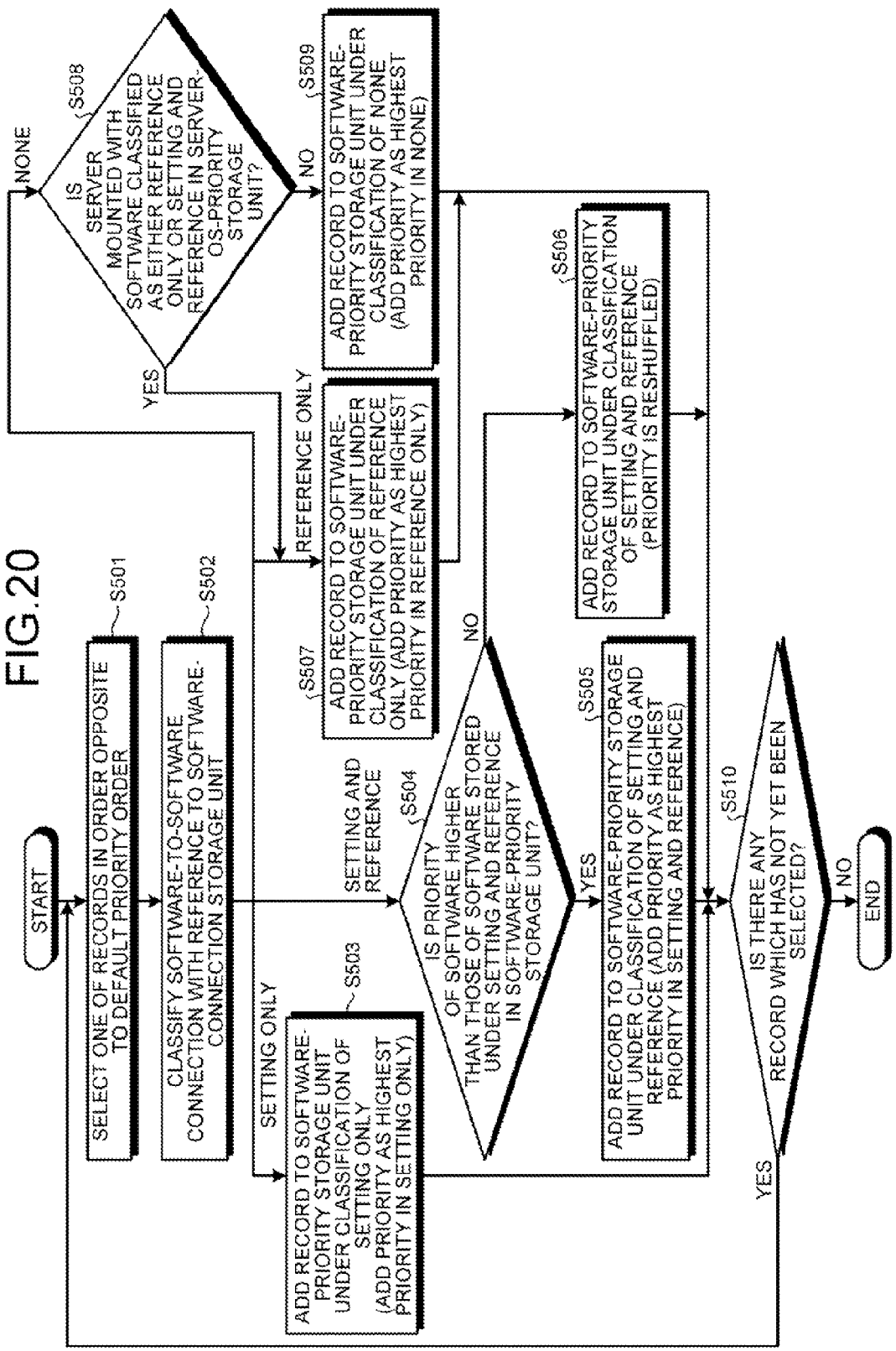
FIG. 20 is a flowchart illustrating a flow of a priority determining process 2 performed by the setting control device according to the second embodiment.

FIG. 20 is a flowchart illustrating a flow of the priority determining process 2 performed by the setting control device according to the second embodiment. Incidentally, the process performed here is that performed at Step S104 in FIG. 13. Furthermore, here, priorities among software are determined in such a way that a priority of software of which the connection state is classified as "none" is highest, followed by that classified as "reference only", that classified as "setting and reference", and that classified as "setting only". Namely, records are stored in the software-priority storage unit 21 in such a way that a "none" record group is stored on top of the table, followed by a "reference only" record group, a "setting and reference" record group, and finally a "setting only" record group. Incidentally, the record group indicates zero or more records, and it doesn't matter if any of the record groups is absent.

As illustrated in FIG. 20, the priority determining unit 35 of the setting control device 10 selects one record on top of stored records which have not yet subjected to the process illustrated in FIG. 20 out of the records stored in the software-information storage unit 17 in order opposite to the order of default priority (Step S501). Namely, the priority determining unit 35 selects one software having the lowest default priority as an object of which the priority is to be determined.

Then, the priority determining unit 35 classifies a software-to-software connection of the selected record, i.e., the software of which the priority is to be determined with reference to the software-connection storage unit 19 (Step S502).

Then, when classified the software-to-software connection as "setting only", the priority determining unit 35 adds a record of a set of server number and software number of the record of which the priority is to be determined to the software-priority storage unit 21 as a record on top of records falling under the classification of "setting only" (Step S503). As a result, the newly-stored software number has the highest priority in those falling under the classification of "setting only".

Furthermore, when classified the software-to-software connection as "setting and reference", the priority determining unit 35 determines whether a default priority of the software is higher than those of software stored under the classification of "setting and reference" in the software-priority storage unit 21 (Step S504). Namely, the priority determining unit 35 determines whether the set of server number and software number of which the priority is currently determined has a higher default priority than sets of server number and software number which have already been stored under "setting and reference".

Then, when the default priority of the set of server number and software number of which the priority is currently determined is higher than those of the already-stored sets (YES at Step S504), the priority determining unit 35 performs Step S505. Namely, the priority determining unit 35 adds the record of the set of server number and software number of which the priority is to be determined to the software-priority storage unit 21 as a record on top of records falling under the classification of "setting and reference". As a result, the newly-stored software number has the highest priority in those falling under the classification of "setting and reference".

On the other hand, when the default priority of the set of server number and software number of which the priority is currently determined is lower than those of the already-stored sets (NO at Step S504), the priority determining unit 35 performs Step S506. Namely, the priority determining unit 35 adds the record of the set of server number and software number of which the priority is to be determined to the software-priority storage unit 21 as a record falling under the classification of "setting and reference" with a reshuffling of priorities. That is, the priority determining unit 35 adds the record of the set of server number and software number of which the priority is to be determined as a record following the already-stored sets of server number and software number so that priorities of the already-stored sets of server number and software number are higher than that of the added set. As a result, the already-stored software numbers have higher priorities than that of the newly-stored software number.

Moreover, when classified the software-to-software connection as "reference only", the priority determining unit 35 adds the record of the set of server number and software number of which the priority is to be determined to the software-priority storage unit 21 as a record on top of records falling under the classification of "reference only" (Step S507). As a result, the newly-stored software number has the highest priority in those falling under the classification of "reference only".

Furthermore, when classified the software-to-software connection as "none", the priority determining unit 35 determines whether the server mounted with the object software is classified as either "reference only" or "setting and reference" with reference to the server-OS-priority storage unit 20 (Step S508). Then, when determined that the server mounted with the object software is classified as either "reference only" or "setting and reference" (YES at Step S508), the priority determining unit 35 performs Step S507. On the other hand, when determined that the server mounted with the object software is not classified as either "reference only" or "setting and reference" (NO at Step S508), the priority determining unit 35 performs Step S509. Namely, the priority determining unit 35 adds the record of the set of server number and software number of which the priority is to be determined to the software-priority storage unit 21 as a record on top of records falling under the classification of "none" (Step S509). As a result, the newly-stored software number has the highest priority in those falling under the classification of "none".

Then, after execution of the above Steps S503 to S509, if there is any record which has not yet subjected to the process illustrated in FIG. 20 out of the records stored in the software-information storage unit 17 (YES at Step S510), return to Step S501, the priority determining unit 35 repeatedly performs the process from Step S501. On the other hand, when there is no record which has not yet subjected to the process illustrated in FIG. 20 out of the records stored in the software-information storage unit 17 and stored on top thereof (NO at Step S510), the priority determining unit 35 ends the process.

Incidentally, after the end of the process from Step S501 to Step S509, software numbers have been stored in the software-priority storage unit 21 in descending order of priority, so after the end of the process from Step S501 to Step S509, the priority determining unit 35 can assign priorities to the software numbers and store the assigned priorities. Furthermore, during the execution of the process from Step S501 to Step S509, the priority determining unit 35 can assign priorities to the stored software numbers and store the assigned priorities each time software number is stored in the software-priority storage unit 21.

Flow of Setting/Start Process

Figure 21:
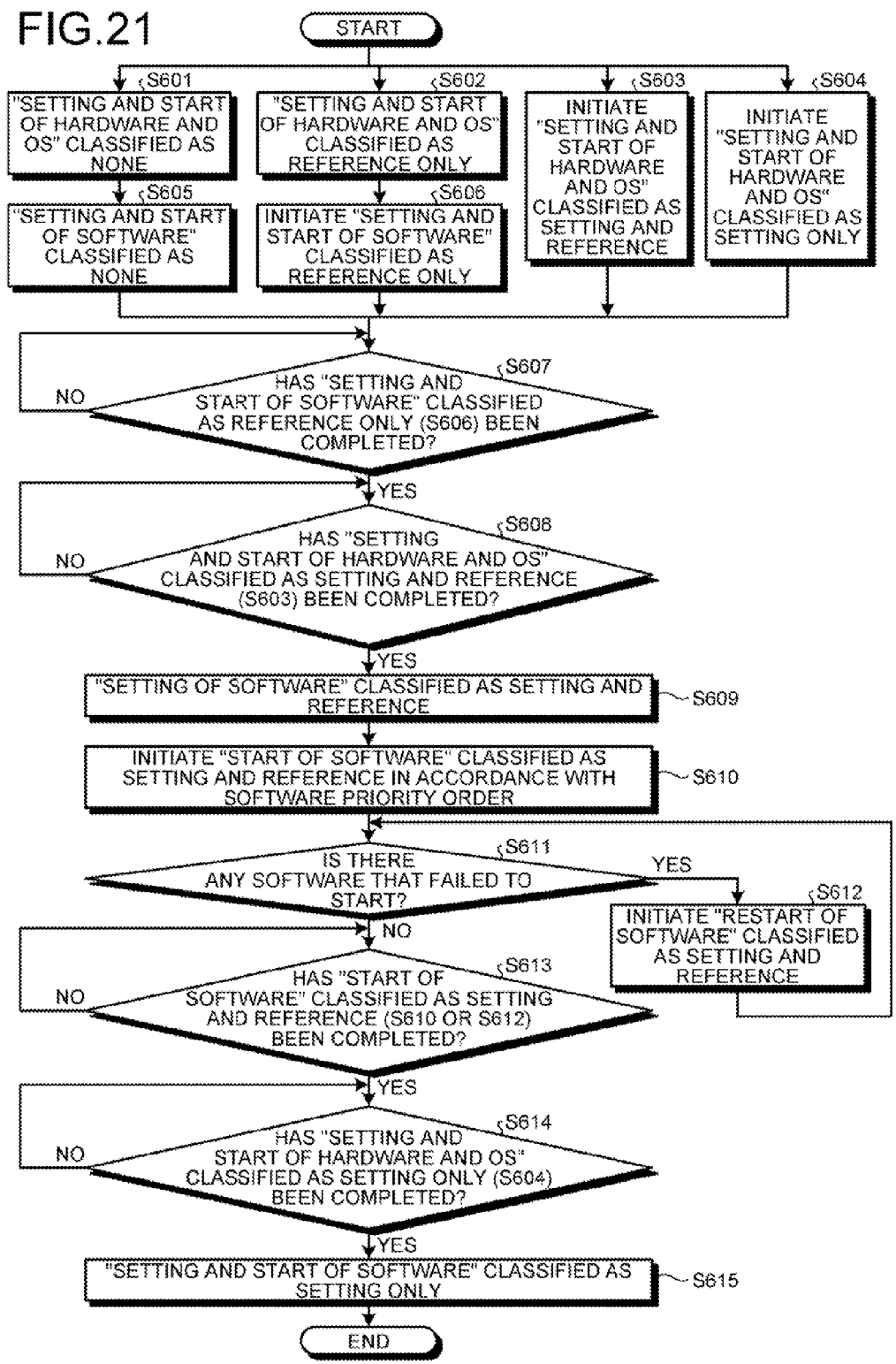
FIG. 21 is a flowchart illustrating a flow of a setting/start process performed by the setting control device according to the second embodiment.

FIG. 21 is a flowchart illustrating a flow of the setting/start process performed by the setting control device according to the second embodiment. Incidentally, the process performed here is that performed at Step S105 in FIG. 13.

As illustrated in FIG. 21, the start control unit 36 of the setting control device 10 sequentially performs the setting and start of hardware and an OS on a highest-priority server of which the connection is classified as "none" with reference to the server-OS-priority storage unit 20 (Step S601).

Furthermore, the start control unit 36 sequentially initiates the setting and start of hardware and an OS on a second-highest-priority server of which the connection is classified as "reference only" with reference to the server-OS-priority storage unit 20 (Step S602).

Moreover, the start control unit 36 sequentially initiates the setting and start of hardware and an OS on a third-highest-priority server of which the connection is classified as "setting and reference" with reference to the server-OS-priority storage unit 20 (Step S603).

Furthermore, the start control unit 36 sequentially performs the setting and start of hardware and an OS on a fourth-highest-priority server of which the connection is classified as "setting only" with reference to the server-OS-priority storage unit 20 (Step S604).

Then, upon completion of the setting and start of the hardware and OS on the server of which the connection is classified as "none" at Step S601, the start control unit 36 performs Step S605. Namely, the start control unit 36 executes a script to sequentially perform the setting and start of highest-priority software of which the connection is classified as "none" with reference to the software-priority storage unit 21.

Furthermore, upon completion of the setting and start of the hardware and OS on the server of which the connection is classified as "reference only" at Step S602, the start control unit 36 performs Step S606. Namely, the start control unit 36 executes a script to sequentially initiate the setting and start of second-highest-priority software of which the connection is classified as "reference only" with reference to the software-priority storage unit 21.

The start control unit 36 performs Steps S601 to S605, and waits until the setting and start of the software of which the connection is classified as "reference only" at Step S606 is completed (Step S607).

After that, upon completion of the process at Step S606 (YES at Step S607), the start control unit 36 waits until the setting and start of the hardware and OS on the server of which the connection is classified as "setting and reference" at Step S603 is completed (Step S608).

Then, upon completion of the process at Step S603 (YES at Step S608), the start control unit 36 executes a script to sequentially perform the setting of third-highest-priority software of which the connection is classified as "setting and reference" with reference to the software-priority storage unit 21 (Step S609).

After that, upon completion of the setting of the software of which the connection is classified as "setting and reference", the start control unit 36 executes a script to sequentially perform the start of the software of which the connection is classified as "setting and reference" in accordance with the software-priority storage unit 21 (Step S610).

If there is any software that failed to start (YES at Step S611), the start control unit 36 executes a script to restart the software that failed to start (Step S612). Incidentally, the number of restarts can be set arbitrarily.

After that, when there is no software that failed to start (NO at Step S611) and the start of the software of which the connection is classified as "setting and reference" has been completed (YES at Step S613), the start control unit 36 performs Step S614. Namely, the start control unit 36 waits until the process at Step S604 has been completed, and upon completion of the process at Step S604, the start control unit 36 performs Step S615. Specifically, the start control unit 36 executes a script to sequentially perform the setting and start of software of which the connection is classified as "setting only" in accordance with the software-priority storage unit 21.

In doing this way, the start control unit 36 can execute a script in accordance with the server setting/start order and the software setting/start order determined by the priority determining unit 35 and make the deployed virtual system operational.

As described above, the setting control device 10 performs the setting and start of a virtual server and the setting and start of software in the order of setting and start of the operation determined on the basis of not a physical or logical configuration of a connection state between virtual servers but how the virtual servers are connected by software. Therefore, the setting control device 10 can assign a new IP address or host name to a virtual server included in a deployed virtual system. Furthermore, the setting control device 10 can change an IP address or host name of an OS or software. Moreover, the setting control device 10 can automatically change a parameter of an IP address or host name specifying a destination of software.

As described above, the setting control device 10 sets various parameters in accordance with a connection state between software; therefore, the setting control device 10 can also automatically change a port number which is a parameter indicating a software connection. Furthermore, an IP address and a host name are a parameter for each server or OS, and a port number is a parameter for each software. The setting control device 10 can automatically decide a relation between these two different levels of parameters, and can automatically set the parameters without creating a flow.

Furthermore, when set a parameter indicating a connection in software to connect to, the setting control device 10 tries to connect to the target software. Therefore, if a parameter has not been set in a destination, an error occurs. In response to this, the setting control device 10 can performs the various settings in the order of no connection, setting and reference, reference only, and setting only; therefore, the setting control device 10 can complete the setting of a parameter in connection-destination software before a parameter is set in connection-source software. Moreover, the setting control device 10 can detect an error resulting in a circular reference; therefore, the setting control device 10 can detect an error before the system operates.

[c] Third Embodiment

The embodiments of the present invention are described above; however, besides the above embodiments, the present invention can be implemented in various different forms. A different form of embodiment is explained below.

Script

Definition, etc. of a script explained in the above embodiments is just an example, and it is not limited to that. For example, various techniques, such as a command and a shell, can be used instead of a script.

Configuration Information

System configuration information and parameters explained in the above embodiments are just examples, and it is not limited to them. For example, system configuration information and parameters can include the state, etc. of assignment of a memory or processor used as configuration information in a general system, and can include bandwidth limitation, etc. on a network. Furthermore, as the parameter, various information other than a port number and an IP address can be applied; for example, authentication information used in authentication of a connection destination among software can be applied.

Template

In the above embodiments, there is described an example where information on a system or software is accepted by using a template; however, it is not limited to this. For example, the information can be accepted on a mere Web screen, or can be accepted on a DB or a table. Furthermore, a system configuration held as a template is just an example, and it is not limited to the system composed of the Web server, the AP server, and the DB server described in the above embodiments.

System

Out of the processes described in the present embodiments, all or part of the process described as an automatically-performed one can be manually performed. Furthermore, all or part of the process described as a manually-performed one can be automatically performed by a publicly-known method. In addition, the processing procedures, control procedures, specific names, and information including various data and parameters illustrated in the above description and the drawings can be arbitrarily changed unless otherwise specified.

Furthermore, components of each device illustrated in the drawings are functionally conceptual ones, and do not always have to be physically configured as illustrated in the drawings. Namely, specific forms of division and integration of the components in the device are not limited to those illustrated in the drawings. In other words, all or some of the components can be configured to be functionally or physically divided or integrated in arbitrary units depending on respective loads or use conditions. Moreover, all or any part of processing functions implemented in the device can be realized by a CPU and a program analyzed and executed by the CPU, or can be realized as hardware by wired logic.

Hardware Configuration

Incidentally, the various processes described in the above embodiments can be realized by causing a computer system, such as a personal computer or a workstation, to execute a program prepared in advance. An example of the computer system that executes a program having the same function as those described in the above embodiments is explained below.

Figure 22:
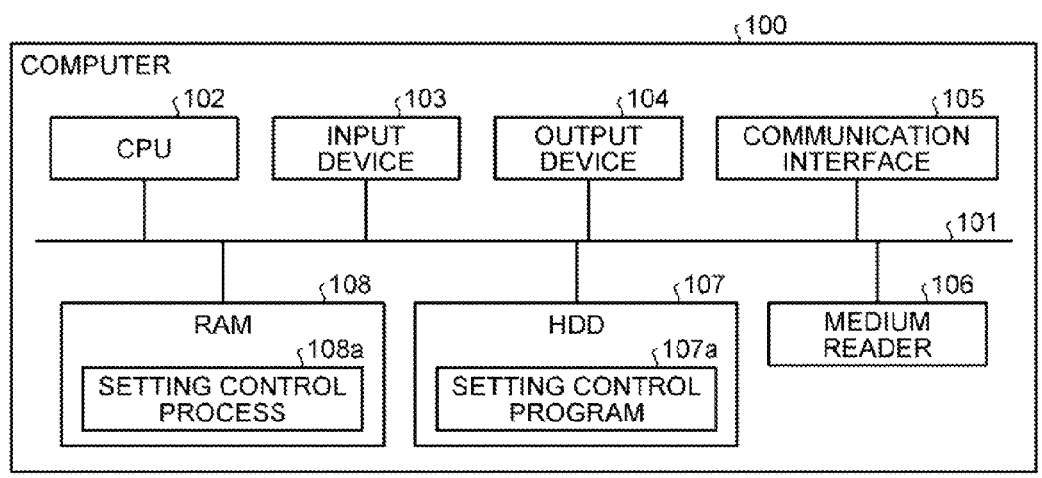
FIG. 22 is a diagram illustrating a hardware configuration example of a computer that executes a setting control program.

FIG. 22 is a diagram illustrating a hardware configuration example of a computer that executes a setting control program. As illustrated in FIG. 22, a computer 100 includes a CPU 102, an input device 103, an output device 104, a communication interface 105, a medium reader 106, a hard disk drive (HDD) 107, and a random access memory (RAM) 108. The units illustrated in FIG. 22 are connected to one another by a bus 101.

The input device 103 is a mouse and a keyboard; the output device 104 is a display or the like; the communication interface 105 is an interface such as an NIC. The HDD 107 stores therein a setting control program 107a and information stored in the storage units illustrated in FIG. 2. The HDD 107 is taken as an example of a recording medium; alternatively, the program can be stored in another computer-readable recording medium, such as a read-only memory (ROM), a RAM, or a CD-ROM, and the computer can read out the program from the recording medium. Incidentally, the recording medium can be placed in a remote location, and the computer can access the storage medium to acquire and use the program. Furthermore, at that time, the computer can store the acquired program in its own recording medium.

The CPU 102 reads out the setting control program 107a and expands the read setting control program 107a into the RAM 108, thereby operating a setting control process 108a for implementing the functions described in FIG. 2, etc. Namely, the setting control process 108a implements the same functions as the information accepting unit 31, the system-deployment control unit 32, the configuration-information extracting unit 33, the connection extracting unit 34, the priority determining unit 35, and the start control unit 36 illustrated in FIG. 2. In this manner, the computer 100 reads and executes the program, thereby operating as an information processing apparatus that executes the setting control method.

Furthermore, the computer 100 can achieve the same functions as those described in the above embodiment by causing the medium reader 106 to read out the setting control program 107a from the recording medium and executing the read setting control program 107a. Incidentally, the program in the present embodiment is not limited to be executed by the computer 100. For example, the present invention can be similarly applied to a case where another computer or a server executes the program and a case where another computer and a server execute the program in cooperation.

It is possible to prevent the occurrence of an error due to processing dependency between software in the setting of respective operating conditions of a plurality of virtual machines.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device comprising:
a memory; and
a processor coupled to the memory, wherein the processor executes a process comprising:
cloning a virtual system having a plurality of virtual machines on a physical machine according to a template which includes a plurality of networks and servers;
determining an order of setting of operating conditions which are set for the plurality of virtual machines and make the plurality of virtual machines operate, respectively, in accordance with processing dependency between software executed by the plurality of virtual machines, wherein the determining includes further determining (1) an order of setting of the software executed by the plurality of virtual machines, (2) to set the respective operating conditions of the plurality of virtual machines in an order of a virtual machine having a parameter referenced by other virtual machines, a virtual machine having a parameter referenced by other virtual machines and a parameter not referenced by other virtual machines, and a virtual machine having a parameter not referenced by other virtual machines and (3) to set a respective parameters used to operate the software in the order of setting of software having a parameter referenced by other software, software having a parameter referenced by other software and a parameter not referenced by other software, and software having a parameter not referenced by other software;
setting parameters for executing operations which are set on the template as the respective operating conditions of the plurality of virtual machines to the plurality of virtual machines, respectively, in the order of setting of operating conditions determined at the determining; and setting the respective parameters used to operate the software in the order of setting of the software determined at the determining.

2. The control device according to claim 1, wherein
the determining determines an order of start of an operation of the operating conditions and an order of start of operation of the software in accordance with the dependency, and
the process further comprises:
starting the operation of each of the plurality of virtual machines in the operation start order determined at the determining; and
starting the operation of the software in the operation start order determined at the determining.

3. The control device according to claim 2, wherein the determining determines to start the operation of the each of the plurality of virtual machine in advance of the start the operation of the software.

4. The control device according to claim 1, wherein the determining extracts a connection between the software using information entered in the template defining a system configuration of the virtual system and information entered in the template defining parameters of the software, and determines the order of setting of the respective operating conditions of the plurality of virtual machines.

5. The control device according to claim 1, wherein, when started software having a parameter referenced by other software and a parameter not referenced by other software failed to activate, the determining restarts the software.

6. The control device according to claim 1, wherein
the determining determines, with respect to each of the plurality of virtual machines, whether or not the each of the plurality of virtual machines is referenced by other virtual machines according to a connection between software which are inputted in the template, and
setting operating condition of the virtual machine which is referenced by other virtual machines on a preferential basis.

7. A control method executed by a computer, the method comprising:
cloning a virtual system having a plurality of virtual machines on a physical machine according to a template which includes a plurality of networks and servers;
determining an order of setting of operating conditions which are set for the plurality of virtual machines and make the plurality of virtual machines operate, respectively, in accordance with processing dependency between software executed by the plurality of virtual machines, wherein the determining includes further determining (1) an order of setting of the software executed by the plurality of virtual machines, (2) to set the respective operating conditions of the plurality of virtual machines in an order of a virtual machine having a parameter referenced by other virtual machines, a virtual machine having a parameter referenced by other virtual machines and a parameter not referenced by other virtual machines, and a virtual machine having a parameter not referenced by other virtual machines and (3) to set a respective parameters used to operate the software in the order of setting of software having a parameter referenced by other software, software having a parameter referenced by other software and a parameter not referenced by other software, and software having a parameter not referenced by other software;
setting parameters for executing operations which are set on the template as the respective operating conditions of the plurality of virtual machines to the plurality of virtual machines, respectively, in the order of setting of operating conditions determined at the determining, using a processor; and
setting the respective parameters used to operate the software in the order of setting of the software determined at the determining.

8. A non-transitory computer-readable recording medium having stored therein a program for causing a computer to execute a control process comprising:
cloning a virtual system having a plurality of virtual machines on a physical machine according to a template which includes a plurality of networks and servers;
determining an order of setting of operating conditions which are set for the plurality of virtual machines and make the plurality of virtual machines operate, respectively, in accordance with processing dependency between software executed by the plurality of virtual machines, wherein the determining includes further determining (1) an order of setting of the software executed by the plurality of virtual machines, (2) to set the respective operating conditions of the plurality of virtual machines in an order of a virtual machine having a parameter referenced by other virtual machines, a virtual machine having a parameter referenced by other virtual machines and a parameter not referenced by other virtual machines, and a virtual machine having a parameter not referenced by other virtual machines and (3) to set a respective parameters used to operate the software in the order of setting of software having a parameter referenced by other software, software having a parameter referenced by other software and a parameter not referenced by other software, and software having a parameter not referenced by other software;
setting parameters for executing operations which are set on the template as the respective operating conditions of the plurality of virtual machines to the plurality of virtual machines, respectively, in the order of setting of operating conditions determined at the determining; and
setting the respective parameters used to operate the software in the order of setting of the software determined at the determining.

* * * * *